(12) United States Patent
Eckerle et al.

(10) Patent No.: US 10,012,276 B2
(45) Date of Patent: Jul. 3, 2018

(54) SYSTEM AND METHOD FOR ELECTRICALLY CONTROLLABLE TRANSMISSIONS

(71) Applicant: SRI International, Menlo Park, CA (US)

(72) Inventors: Joseph Stephen Eckerle, Woodside, CA (US); Brian K. McCoy, San Jose, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 22 days.

(21) Appl. No.: 14/746,762

(22) Filed: Jun. 22, 2015

(65) Prior Publication Data

US 2016/0017940 A1    Jan. 21, 2016

Related U.S. Application Data

(60) Provisional application No. 62/016,560, filed on Jun. 24, 2014.

(51) Int. Cl.
*F16H 48/06* (2006.01)
*F16D 48/06* (2006.01)

(52) U.S. Cl.
CPC .... *F16D 48/064* (2013.01); *F16D 2500/1022* (2013.01); *F16D 2500/10475* (2013.01);
(Continued)

(58) Field of Classification Search
CPC ........... F16D 48/064; F16D 2500/1022; F16D 2500/10475; F16D 13/40; H02N 13/00
(Continued)

(56) References Cited

U.S. PATENT DOCUMENTS 2,886,985 A * 5/1959 Meyer ................... F16D 13/025
                                                  192/41 R
2,887,200 A * 5/1959 Mergen ................... B64C 11/36
                                                  192/35
(Continued)

FOREIGN PATENT DOCUMENTS

EP    0285244 A1    10/1988
EP    2166247 A2 *  3/2010  ........... F16D 48/064
(Continued)

OTHER PUBLICATIONS

Machine translation of EP2166247.*
(Continued)

*Primary Examiner* — Stacey Fluhart
(74) *Attorney, Agent, or Firm* — McDonnell Boehnen Hulbert & Berghoff LLP

(57) ABSTRACT

Systems and methods are shown for electrically controllably transmitting power from a motor involving electrically controllably coupling the first input hub to a shuttle so that power is transmitted from the first input hub to the shuttle, providing for one-way rotation between the shuttle and a stationary chassis, and coupling the shuttle to an output hub with a spring such that energy is stored and released from the spring as the output hub rotates. Examples are shown that include controlling engaged and disengaged time intervals of the first input hub and shuttle to maintain a torque level at the output hub, such as by utilizing pulse width modulation or pulse frequency modulation. Examples are also shown involving electroadhesively coupling the first input hub to the shuttle.

12 Claims, 22 Drawing Sheets

(52) U.S. Cl.
CPC .............. *F16D 2500/10493* (2013.01); *F16D 2500/3166* (2013.01); *F16D 2500/7044* (2013.01); *F16D 2500/7109* (2013.01)

(58) Field of Classification Search
USPC .............................................. 192/3.23, 12 B
See application file for complete search history.

(56) References Cited

U.S. PATENT DOCUMENTS

| | | | |
|---|---|---|---|
| 3,163,272 A * | 12/1964 | Baumann | F16D 37/02 |
| | | | 192/21.5 |
| 3,463,263 A | 8/1969 | Winter | |
| 3,871,944 A * | 3/1975 | Dominguez-Burguette | F16D 63/002 |
| | | | 188/159 |
| 5,135,086 A | 8/1992 | Ciolli | |
| 6,333,577 B1 | 12/2001 | Kusumoto et al. | |
| 6,481,732 B1 * | 11/2002 | Hawkins | B60G 17/0162 |
| | | | 280/124.106 |
| 7,553,134 B2 | 6/2009 | Uno et al. | |
| 7,780,567 B2 | 8/2010 | Hendrickson et al. | |
| 2007/0117668 A1 | 5/2007 | Sowul et al. | |
| 2009/0203479 A1 * | 8/2009 | Krause | F16H 3/663 |
| | | | 475/59 |
| 2014/0193194 A1 * | 7/2014 | Mathie | F16D 1/02 |
| | | | 403/359.6 |

FOREIGN PATENT DOCUMENTS

| | | |
|---|---|---|
| JP | 2002070897 A | 3/2002 |
| WO | 92/19880 A2 | 11/1992 |

OTHER PUBLICATIONS

Definition of "shuttle," retrieved from www.merriamwebster.com.*
International Search Report and Written Opinion of International Application No. PCT/US2015/037032, dated Aug. 31, 2015 (dated Sep. 17, 2015).
European Search Report, European Patent Application No. 15812612.8 dated Mar. 28, 2018, 7 pages.

* cited by examiner

Magnified view of 260

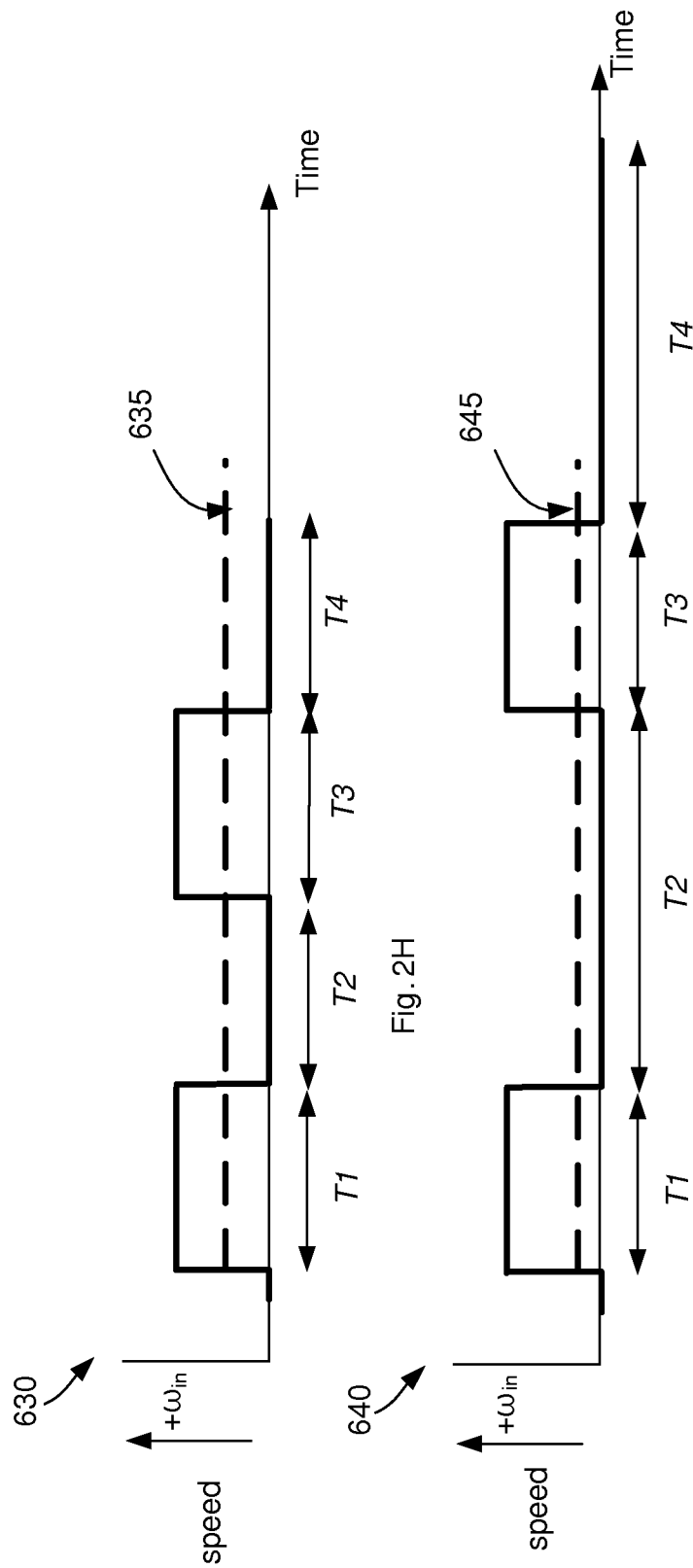

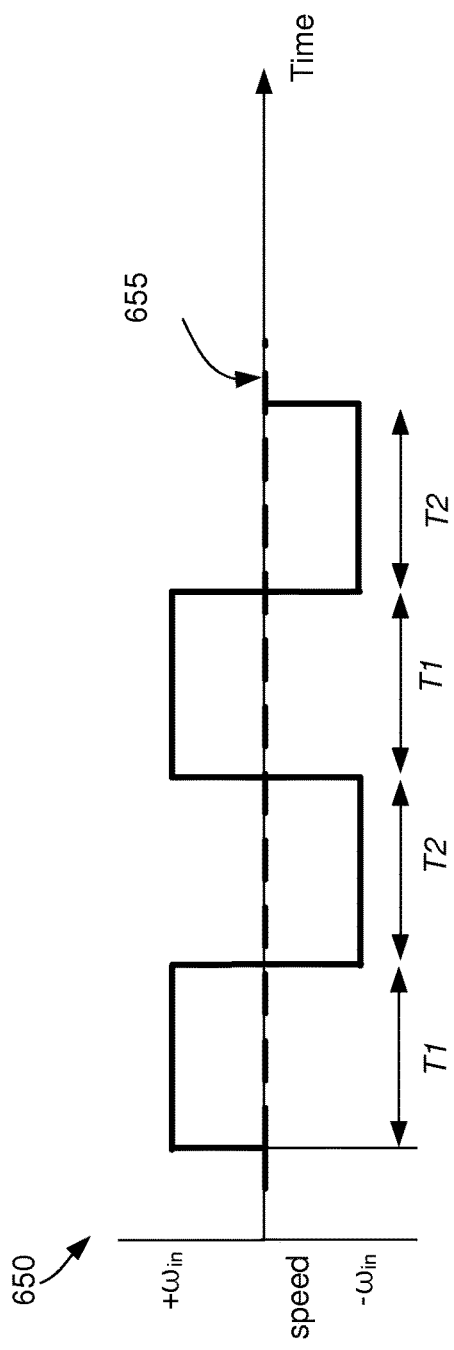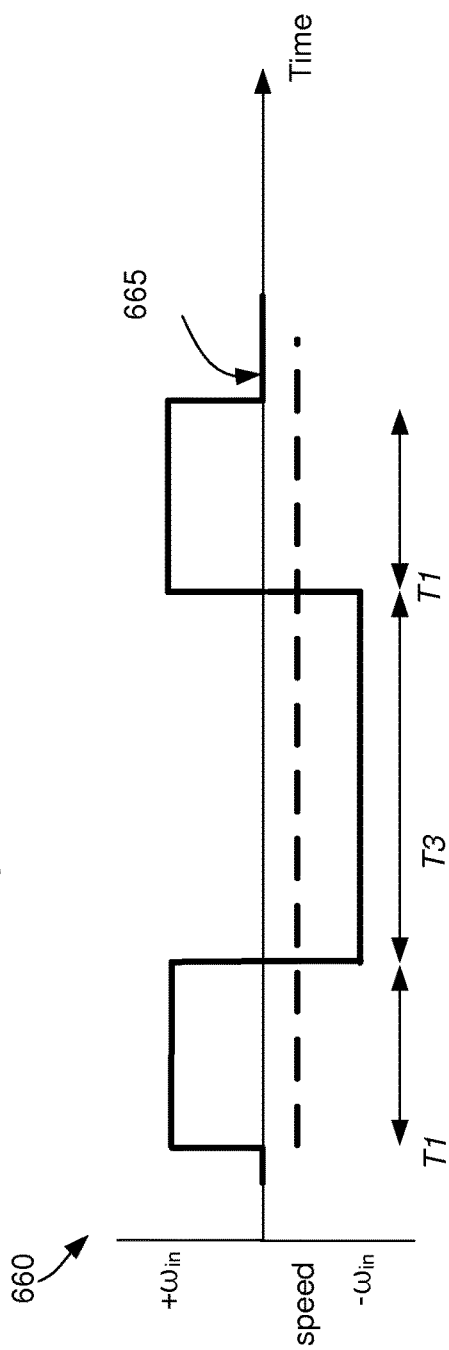

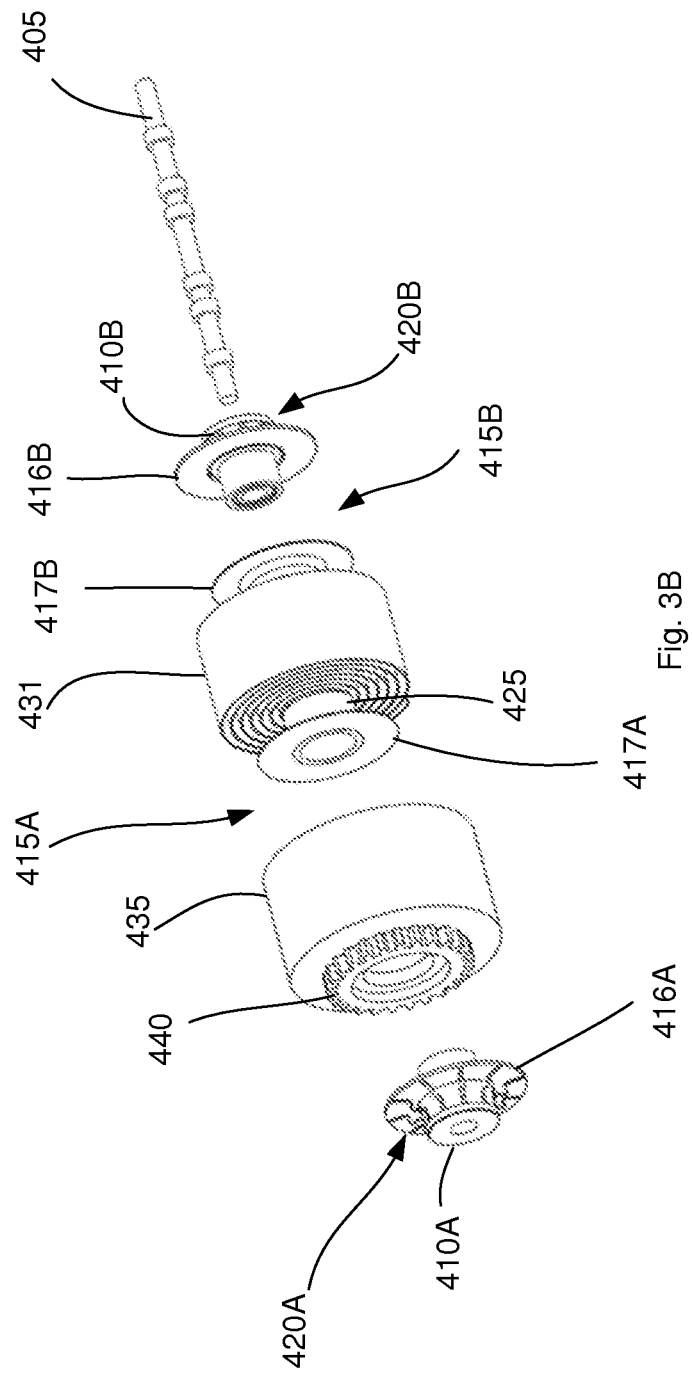

SYSTEM AND METHOD FOR ELECTRICALLY CONTROLLABLE TRANSMISSIONS

CROSS REFERENCE TO RELATED APPLICATIONS

This application claims the benefit of U.S. Provisional Patent Appl. No. 62/016,560 for "Transmissions Using Electronic Circuit Analogs" filed Jun. 24, 2014, herein incorporated by reference in its entirety for all purposes.

BACKGROUND

The use of drives and transmissions in mechanical and electromechanical systems is quite common for such applications as transportation, motion control, electronics, machine tools, printing machines, robotics and aerospace. When the load requirements are predictable, it is generally simple to design a drive or transmission system with single or multiple gear stages. The situation becomes more complex when the load requirements vary and are unpredictable. Usually in these circumstances, the systems are designed with maximum anticipated values such as maximum anticipated speed and maximum anticipated torque. As a wide range of torque and speeds need to be provided, the drive and transmission systems typically are larger in size, having more components and thereby increasing the cost.

Robotic systems are one example of a context where these issues arise. Robots are currently being used in numerous applications and in numerous ways. A few examples of their utilization may be found in industrial applications where robots are used to perform repetitious or strenuous tasks and in medical applications sometimes to assist a surgeon in performing surgery through teleoperation. For all their proliferation, robots are still limited in various ways.

One limitation which characterizes many robots is that they can only operate a certain amount of time with a given battery size. One cause of this limitation is due to the losses that occur in the process of converting electrical energy to mechanical outputs. Improving the efficiency of conversion would then directly lead to longer operation time with a given a battery size. In addition, the concepts to improve efficiency in mobile robots may be advantageous on stationary wall powered robots as well. For example, improved efficiency may lead to smaller motors thus leading to more compact design.

Yet another limitation that also characterizes many robots is that they are often designed for the worst case load or speed conditions, making them big and bulky. Designing a robot that can quickly adapt to changing load conditions and operate with high efficiency would be desirable. A desirable characteristic for many robotic systems is to have drive systems that achieve high gear reduction ratios. Typically, in conventional systems, high gear reduction ratios are achieved by addition of multiple gear stages. This adds weight to the system which consequently causes the inefficiencies to increase further which again contributes to lower operating range or duration in the case of mobile robots. Transmission systems with large gear reduction ratios in a single stage are available commercially. However, these systems still have the disadvantages of being expensive and needing precise manufacturing techniques.

Thus there is a need for efficient, light-weight, compact and fast actuating multispeed or variable transmissions which can be applied in actuators, manipulators, such as are used in robotics, and other devices to address the needs stated above. Multispeed or variable transmissions have been developed for a variety of applications but have not been widely used in robotics and other systems due to their complexity, volume and weight. Thus there is a need for single stage, efficient, light-weight, compact, low-cost drive systems which achieve high gear ratio reduction. More advantages may be obtained by making the transmissions variable.

In many applications, some as robots, since the speeds and torques of manipulators are highly cyclical and variable, using fixed gear ratio transmissions results in high energy inefficiencies because the motor is usually operating away from its optimum efficiency speed. It also limits the range of forces and speeds the manipulator can operate at, often forcing a designer to oversize the motors in order to meet worst case requirements. Just as a fixed-gear bicycle does not provide efficient locomotion in hilly terrain, a fixed-gear-ratio transmission actuator limits the capabilities of a robotic joint and wastes energy Minimizing the time it takes to change gear ratios also leads to advantages since any delays would limit the speed at which the manipulator can change loads and as a result the range of tasks that it can accomplish. For example, for a walking robot, the leg needs to move fast and with no load during the swing phase, but slower and with a higher load during the stance phase of the stride. Similarly, during a pick and place operation, a manipulator placing a heavy load will need to switch between high load/low speed and low load/high speed quickly to enable minimizing the cycle time.

Other advantages may be realized by being able to shift gear ratios under load and at zero speed to avoid limiting the range of tasks an actuator or manipulator can perform. Many existing transmission designs can only shift when they are in movement or not under load

SUMMARY

In one example, an electrically controllable transmission system is shown having a first input hub for receiving power from a motor or other actuator and a first electrically controllable clutch with a first portion coupled to the first input hub and a second portion, where the first and second portions may be electrically controllably coupled to one another such that power is transmitted from the first portion to the second portion. The second portion of the first electrically controllable clutch is connected to a shuttle and a bias member couples the shuttle to an output hub. A first one-way clutch also couples the shuttle to a stationary chassis or frame. In some examples, the first and second portions of the electrically controllable clutch are configured to be electroadhesively engaged, such as where the first electrically controllable clutch is an electrolaminate disc clutch, an electrolaminate activated wrap spring clutch, or an electromagnetically activated wrap spring clutch. In some examples, the bias member coupling the shuttle to the output hub may be a torsional spring, a torsional tube, or a combination.

In still other examples, the electrically controllable transmission system includes a control circuit configured to control engaged and disengaged time intervals of the first electrically controllable clutch to maintain a torque level at the output hub. In some examples, the control circuit utilizes pulse width modulation or pulse frequency modulation. Some examples may use a mechanical equivalent of a buck circuit or a class D circuit to control the torque level.

In another example, the electrically controllable transmission system also includes a second input hub for receiving power from the motor and a second electrically controllable clutch with a first portion coupled to the second input hub and a second portion, where the first and second portions are electrically controllably coupled to one another such that power is transmitted from the first portion to the second portion. A second one-way clutch couples the second portion of the second electrically controllable clutch to the second input hub. A shuttle connects the second portion of the two controllable clutches together. The drive train from the motor is arranged so that the first input hub spins in one rotational direction and the second input hub spins in an opposite rotational direction. In other examples, the system further includes a control circuit configured to control engaged and disengaged time intervals of the first and second electrically controllable clutches to maintain a torque level at the output hub and the control circuit may be configured to control the engaged and disengaged time intervals of the first and second electrically controllable clutches using a mechanical equivalent of a buck circuit or a class D circuit or using pulse width modulation or pulse frequency modulation or a combination.

An example of a method for electrically controllably transmitting power from a motor is shown that involves receiving power from a motor at a first input hub, electrically controllably coupling the first input hub to a shuttle such that power is electrically controllably transmitted from the first input hub to the shuttle, providing for one-way rotation of the shuttle, and coupling the shuttle to an output hub with a bias member such that energy is stored and released from the bias member as the output hub rotates. In some examples of a method, the step of electrically controllably coupling the first input hub to a shuttle further includes electroadhesively coupling the first input hub to the shuttle, such as through the use of an electrolaminate disc clutch, an electrolaminate activated wrap spring clutch, or an electromagnetically activated wrap spring clutch. In some examples, the step of coupling the shuttle to an output hub involves the use of a mechanical equivalent of a buck circuit or a class D circuit or the use of a torsional spring, a torsion tube, or a combination.

In some examples of the method, the step of electrically controllably coupling the first input hub to a shuttle involves controlling engaged and disengaged time intervals of the first input hub and shuttle to maintain a torque level at the output hub, such as through the use of pulse width modulation or pulse frequency modulation.

Other examples of the method for electrically controllably transmitting power involve also receiving power from the motor at a second input hub, electrically controllably coupling the second input hub to the shuttle such that power is electrically controllably transmitted from the second input hub to the shuttle, and providing for one-way rotation between the second input hub and the shuttle, with the input drive train arranged such that the first input hub spins in one rotational direction and the second input hub spins in an opposite rotational direction. In some examples, the method includes controlling engaged and disengaged time intervals of the first and second input hubs with the shuttle to maintain a torque level at the output hub, such as through the use of a mechanical equivalent of a buck circuit or a class D circuit or the use of pulse width modulation or pulse frequency modulation.

BRIEF DESCRIPTION OF THE DRAWINGS

Various embodiments in accordance with the present disclosure will be described with reference to the drawings, in which:

FIG. 2H is a graph illustrating an example of a pulse frequency modulation scheme for a buck circuit;

FIG. 2I is another graph illustrating the example of a pulse frequency modulation scheme for a buck circuit;

FIG. 2J is a graph illustrating an example of a pulse frequency modulation for a class D circuit;

FIG. 2K is another graph illustrating the example of a pulse frequency modulation for a class D circuit;

FIG. 3B is an exploded perspective view of the device in FIG. 3A;

Note that the same numbers are used throughout the disclosure and Figures to reference like components and features.

DETAILED DESCRIPTION

Figure 1A:
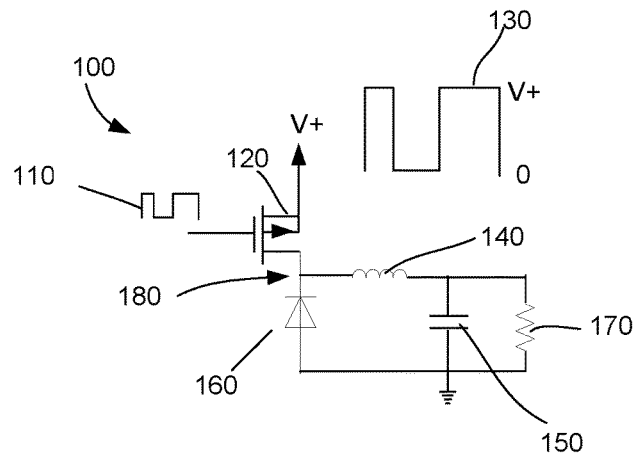
FIG. 1A is a circuit diagram illustrating an example of a buck circuit.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Examples are described herein of transmission systems that are electronically controllable. Some examples of transmission systems use electrolaminate disc clutches to transfer power from a motor to an output hub. While the examples discussed herein are described in the context of robotic systems, many aspects of the present examples may be adapted to a variety of applications where it is advantageous to provide actuators or manipulators that are efficient and light-weight, such as motion control, electronics, machine tools, printing machines, micro electro-mechanical systems (MEMS), nano electro-mechanical systems (NEMS), and aerospace.

For example, in the field of robotics, systems are typically designed with one motor per degree-of-freedom (DOF). Each motor would then be sized for the maximum load/power requirements for its DOF. The resulting robot would consequently carry more motor horsepower than it may need at any instant. Some aspects of the examples in this disclosure permit architectures with as few as one motor, sized to meet the maximum power demands of the entire robot. Further, the motors may run at a constant speed thereby improving their efficiency. Some aspects of the examples in this disclosure describe transmission methods to produce a variable speed at the output hub, within an operating range, despite having a single constant speed motor. The examples of transmission systems described in this disclosure differ from typical conventional continuously-variable-transmissions (CVTs) and infinitely-variable transmissions (IVTs) in that the conventional systems utilize relatively slow, energy consuming methods of changing gear ratios. In contrast the transmission system examples of this disclosure may offer fast methods to change the gear ratio.

In some examples, the output hub of the present transmission systems may only rotate in one direction but the speed of the output hub may vary continuously between zero and a maximum value. In some other examples, the output hub of the transmission system may rotate in both directions and the speed of the output may vary between a maximum value in one rotational direction to a maximum value in the other rotational direction. A design goal of many robot systems is to minimize total weight. However, as stated earlier, if a robot has multiple motors and each motor is sized for maximum load/power requirements of a degree of freedom (DOF), then the total weight may be higher than desired. Hence, examples in this disclosure allow realization of robots and other types of equipment that are lighter.

Several benefits may be realized with some of the transmission system examples described in this disclosure. For example, a robot built utilizing the approaches described in this disclosure may have many fewer motors and as few as one motor. This may enable a decrease in the total weight of the robot, leading to improved payload or range. Improved efficiency may also be obtained by running the motors at a constant speed which becomes possible utilizing the examples described below. Other benefits, in some examples, may include that by using a centralized motor system, motors may no longer need to be placed at extremities of the robot actuator systems such as a robot arm. This leads to lower inertia of these actuator systems which again leads to improved efficiency and higher speed/acceleration of the arm.

Further benefits, in some examples, may include that by needing fewer motors, additional motors may be included in the robot architecture for redundancy without adding undue weight. Redundant motors in a multi motor system becomes impractical if each DOF is associated with its own motor.

Yet more benefits, in some examples, may include transmission systems that permit energy recovery. For example, for 2-legged robots that walk, energy may be recovered while deceleration of one leg occurs. This energy may be used to power the acceleration of the other leg. These and other benefits of some of the examples will become clear from the descriptions below.

Many conventional constantly variable transmissions (CVTs) and infinitely variable transmissions (IVTs) exist. However, unlike the conventional transmissions, the examples described in this disclosure offer rapid changing of transmission ratio under electronic control. Further the electronic control may be realized with a device (the electrolaminate clutch) that is inexpensive and lightweight and requires very little power to drive it. This is in contrast to the heavy and energy consuming methods of changing ratios in conventional CVTs and IVTs Mechanically Switching Variable Transmission Systems Variable transmissions are typically not used in robots because of the inability to achieve fast gear ratio changes and because of the large volume and weight required to implement them. However, utilizing aspects of the examples described below, the volume and weight requirements are reduced to practical ranges while providing a transmission that can change gear ratios quickly and over a wide range of values. To help in understanding aspects of the examples, electrical analogies will be utilized. The use of electrical analogies for describing mechanical devices is well known. In this disclosure, the following analogs are used: the mechanical analog of a switch is a clutch, the mechanical analog of a diode is a one way overrunning clutch, the mechanical analog of an inductor is a torsion spring, the mechanical analog of a capacitor (connected to ground) is a rotational inertia (flywheel), the mechanical analog of electrical current is torque and the mechanical analog of voltage is rotational velocity. Other analogs are possible. To aid in understanding the variable transmission concepts, two electrical circuits are briefly described below. Each circuit will then be associated with different embodiments of the variable transmission. These two circuits, the buck circuit and the class-D amplifier circuit, are well described in the open literature so only the salient points will be described here. It is also to be noted that these two circuits although closely related do have some differences which will be described due to their pertinence to this disclosure FIG. 1A illustrates a buck circuit. The heart of the circuit is the power device 120 which may typically be a metal oxide semiconductor field effect transistor (MOSFET). The transistor 120 is powered by a positive voltage V+. This terminal where the transistor is connected to the V+ is commonly called the source terminal. An input signal 110 is fed into the transistor at the gate terminal. Further, a diode 160 is connected to the third terminal which is numbered as 180 in the Figure and is commonly called the drain. Further, the terminal 180 is connected to electrical ground via the diode as illustrated in the Figure. The transistor 120 simply acts as a switch in that the voltage at terminal 180 ideally switches between V+ and 0 depending on the gate signal 110. The signal at terminal 180 is a magnified form of the signal 110 and is shown as 130 in the Figure. Terminal 180 is also connected to an inductor 140 and a capacitor 150 which form a low pass filter. Finally a load 170 is connected to the output of the low pass filter. The low pass filter filters out rapidly-changing signals so that the load only sees a smoother version of the signal 130. More details about the functioning of this circuit will be described below.

Figure 1B:
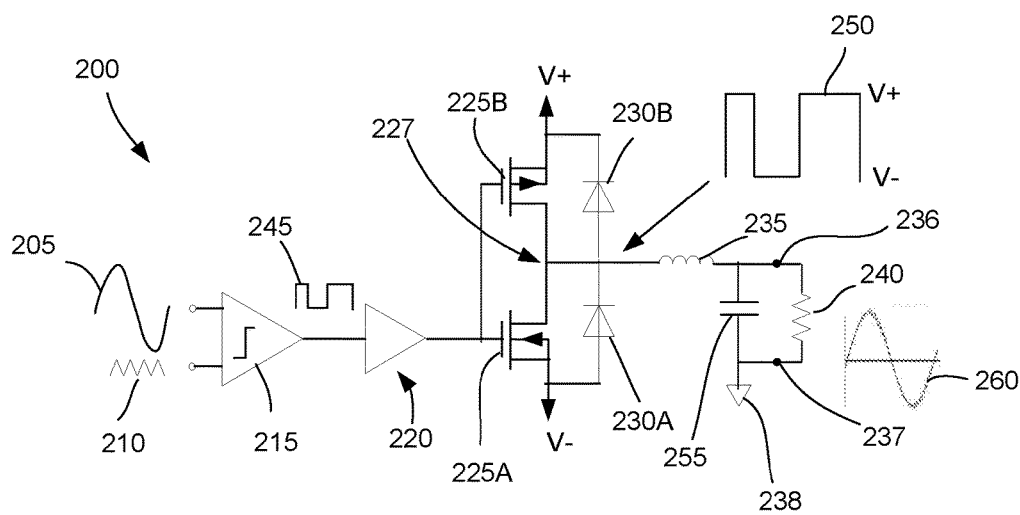
FIG. 1B is a circuit diagram illustrating an example of a class D circuit.
Figure 1C:
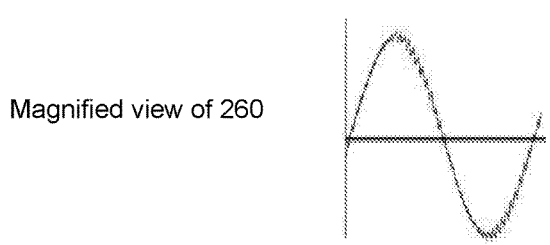
FIG. 1C is a magnified view of signal 260 shown in FIG. 1B.

FIG. 1B illustrates a class D amplifier. The heart of the circuit are the two power devices 225A and 225B. Typically these devices are metal oxide semiconductor field effect transistors (MOSFETs). These devices are operated as binary switches and they are either ideally fully on or fully off but with only one switch being on at any instant of time. The class D amplifier is used to amplify input signals with high efficiency (i.e. with minimal generation of heat). In the Figure, an input signal is shown as a sinusoid 205 going into a comparator 215. The other input of the comparator is a triangular signal 210 with a frequency much larger than the sinusoid. The output of the comparator is shown as a binary signal 245, where the width of each pulse encodes the input signal 205. Signal 245 is a representation of input signal 205 and is called a pulse width modulated signal. The signal 245 is fed as input to the two MOSFETs 225A and 225B. The output of the class D circuit, which is shown as 250 in the Figure, may be V+ or V− where V+ and V− are power supply voltages. Due to the arrangement of the MOSFETs and the diodes 230A and 230B, the output 250 is an amplified version of signal 245. Signal 250 is fed into a low pass filter formed by the inductor 235 and capacitor 255 (LC circuit) which suppresses the high frequency components in the signal 250. The final output signal is illustrated as 260 appearing across a load 240. The signal 260 is an amplified version of the input signal 205 with a small amount of superimposed ripple.

From the descriptions of the buck circuit 100 and the class D circuit 200, it may be now evident that the two circuits are similar to some extent. One difference though is that the output of a buck circuit swings between 0 and V+ or alternatively between V− and 0 (provided the power source is a negative voltage) and the output of the class D circuit swings between V+ and V−. In the mechanical analog which will be described in detail below, the difference in the output between the two circuits translates to the output of the mechanical analog of the buck circuit rotating only in one direction and the output of the mechanical analog of the class D circuit rotating in both directions. Simplified mechanical models described below provide a more detailed explanation.

Figure 2A:
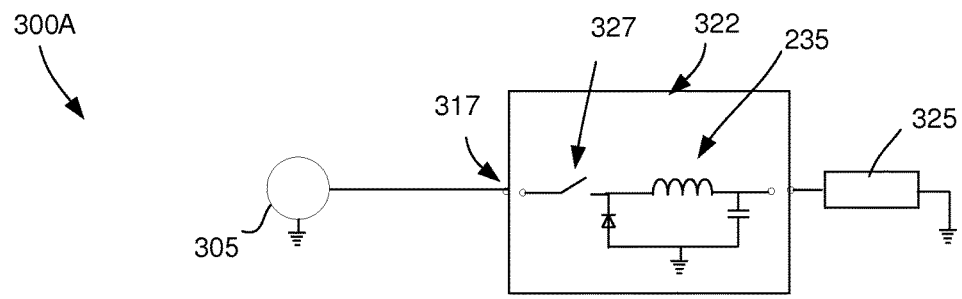
FIG. 2A is a circuit diagram illustrating an example of a mechanical analog of the buck circuit.
Figure 2B:
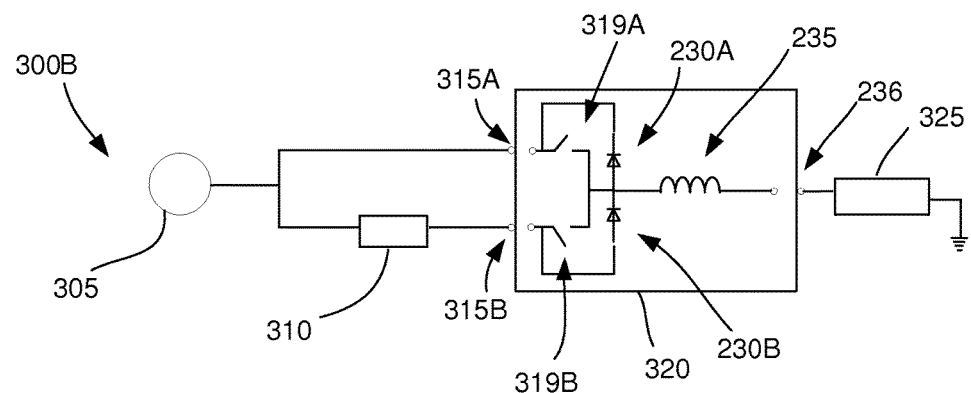
FIG. 2B is a circuit diagram illustrating an example of a mechanical analog of a class D circuit.

FIGS. 2A and 2B illustrate simplified mechanical models of the buck circuit and the class D circuit respectively. To emphasize the similarity, some enumerated members in both Figures have the same numbers. Both Figures show a single constant speed motor as 305. In FIG. 2A, there is only a single coupling between the motor and the mechanical analog 322 of the buck circuit where as in FIG. 2B, the motor is coupled directly and via a reversing gear 310 to the mechanical analog 320 of the class D circuit. Terminal 317 of FIG. 2A corresponds to V+ in FIG. 1A and terminal 315A and 315B correspond to V+ and V− in FIG. 1B. The order of correspondence between the terminals 315A and 315B and polarity of voltage V+ or V− is not material to this discussion. The switch 317 in FIG. 2A corresponds to the transistor 120 in FIG. 1A and the switches 319A and 319B in FIG. 2B correspond to the transistors 225A and 225B of FIG. 1B. The inductors, resistors and the diodes are depicted in a similar manner between FIGS. 1A and 2A and between FIGS. 1B and 2B. Box 325 represents the load. FIGS. 2A and 2B illustrate that whereas the buck circuit has only one switch, the class D circuit has two switches. In operation, which will be described below, any one of the switches of the class D circuit operates similar to the single switch of the buck circuit so by understanding the operation of the buck circuit, the operation of the class D circuit may be understood. Finally, it must be noted that in both the FIGS. 2A and 2B, the mechanical analog of the inductor is a spring and the mechanical analog of the diode is a one-way clutch.

Figure 2C:
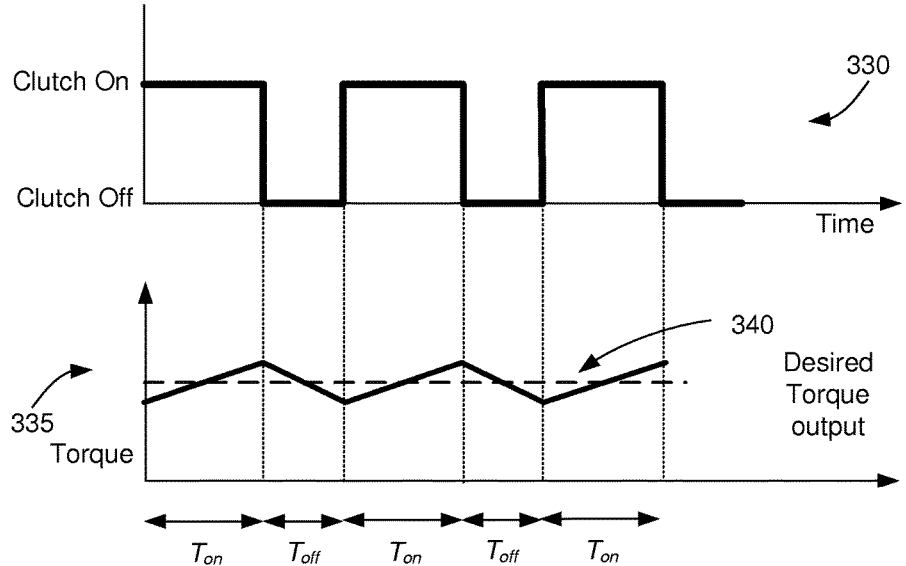
FIG. 2C is a graph illustrating an example of the operation of the buck circuit of FIG. 2A.

FIG. 2C illustrates the operation of the buck circuit of FIG. 2A with the help of two graphs 330 and 335. Graph 330 illustrates the on off sequence of switch 327 as a function of time. When this switch is closed (i.e. when the clutch is engaged), the input at 317 is coupled to the mechanical analog of the inductor 235 which is a spring, such that the spring will rotate in the direction of the motor. Referring to graph 335, this graph refers to the conditions experienced by a load coupled to the spring. The load experiences a rise in the applied torque when the switch 327 is closed (or alternatively when the clutch corresponding to switch 327 is engaged). The spring stores energy during the times when the switch is closed (or alternatively when the clutch is engaged), specifically during the Ton intervals. During Toff intervals when the switch is off (alternatively when the clutch is disengaged), the spring releases its energy, still driving the load with torque decreasing over time as indicated in graph 335 during these intervals. Hence it can now be seen that by alternately turning the switch on or off (or alternatively by causing the clutch to engage and disengage) and by choosing the Ton and Toff intervals appropriately, a desired average torque output (340 in graph 335) may be obtained with a caveat that a certain amount of ripple may exist in the output torque. Note that a spring is one form of a bias member that elastically stores energy when displaced from its bias state and releases energy as it returns to its bias state. Other forms of bias member may be utilized in various examples to achieve the inductive energy storage and return, which will be appreciated by one of ordinary skill in the art.

Figure 2D:
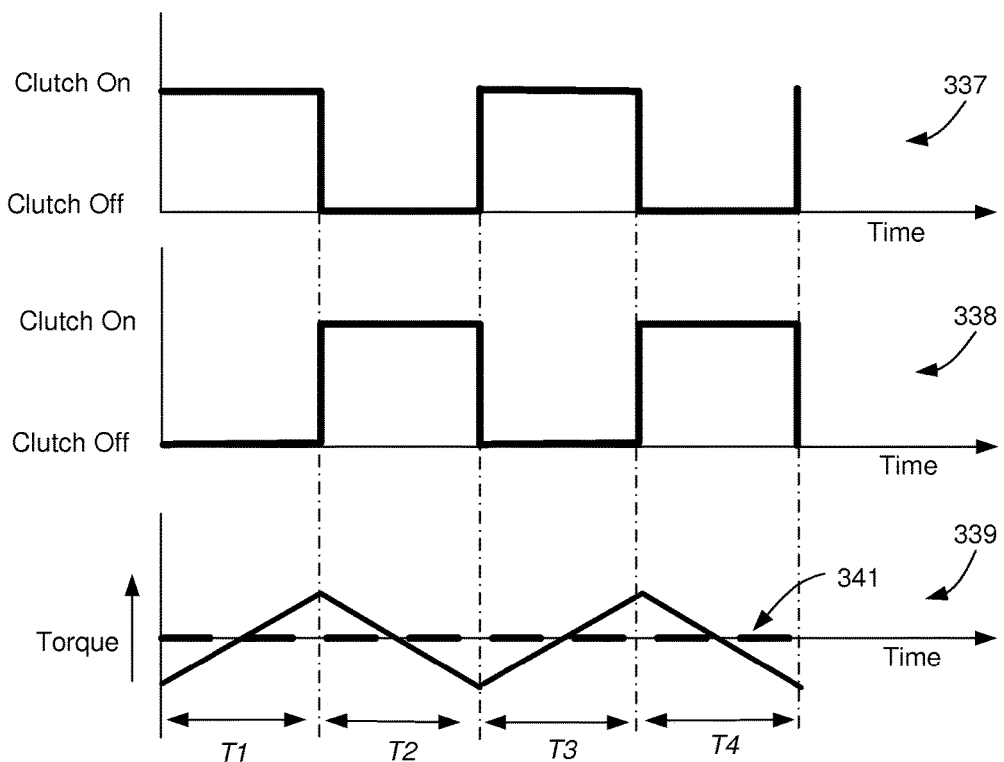
FIG. 2D is a graph illustrating an example of the operation of the class D circuit of FIG. 2B.

FIG. 2D illustrates the operation of the class D circuit of FIG. 2B with the help of three graphs 337, 338 and 339. As illustrated in FIG. 2B, there are two switches in the class D circuit hence the on-off sequence of both are illustrated in graphs 337 and 338. These two switches correspond to clutches each of which when turned on, couples the direct motor input or the reversed motor input to the rest of the circuit. As can be seen in graphs 337 and 338, only one clutch is on at any one instant of time. As noted in the FIGS. 2B and 2D, clutch 319B corresponds to graph 337 and when this clutch is turned on, it causes the load torque increase in the positive direction or in the direction of the motor spin. Similarly, clutch 319A corresponds to graph 338 and when this clutch is turned on, it causes the load torque to decrease (i.e. become more negative, which is the direction opposite the direction of the motor spin) With this explanation, it can be seen if clutch 319B is turned on and clutch 319A is turned off, for instance in intervals T1 and T3, the load experiences an increasing torque. Then, when clutch 319B is turned off and 319A is turned on for instance in the intervals T2 and T4, first the positive torque decreases and then the torque in the negative direction increases. Thus for this specific example, the load experiences an average torque as illustrated by the dashed line 341. Hence it can now be seen that by choosing the on-off sequence of both switches appropriately, a desired torque level may be achieved. A few more examples with different on-off sequence will now be described.

Pulse Width Modulation

Figure 2E:
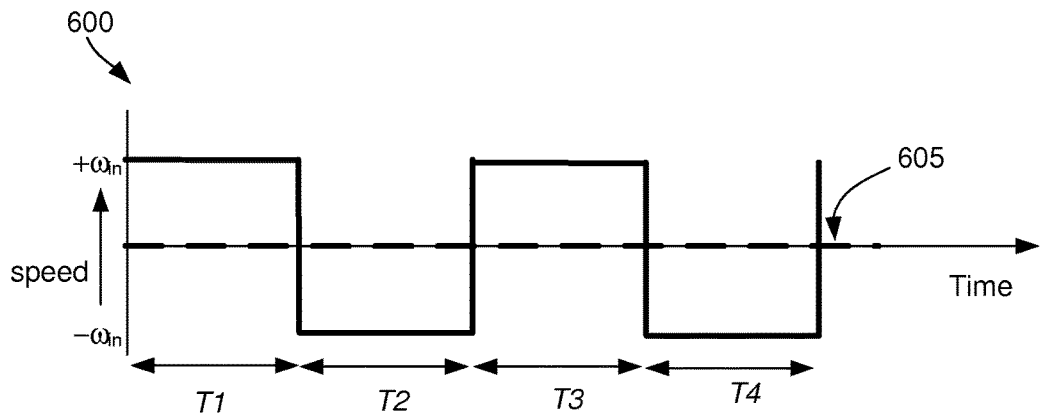
FIG. 2E is a graph illustrating an example of a pulse width modulation scheme for controlling a transmission.
Figure 2F:
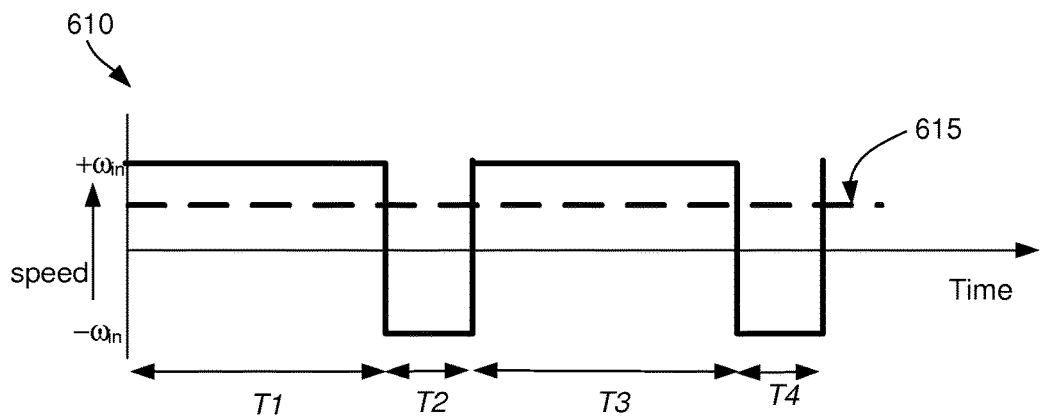
FIG. 2F is another graph illustrating the example of a pulse width modulation scheme for controlling a transmission.
Figure 2G:
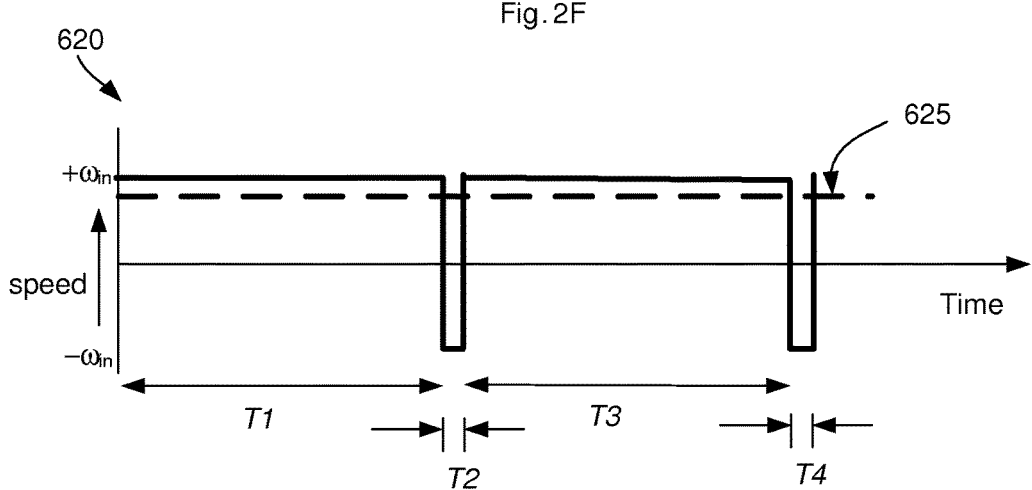
FIG. 2G is yet another graph illustrating the example of a pulse width modulation scheme for controlling a transmission.

It can be seen from the above descriptions that any appropriate torque level may be achieved with an appropriate on-off sequence. This is true for the buck circuit analog and for the class D circuit analog, the difference being that the buck circuit can only provide torque in one direction whereas the class D can provide torque in both directions. In examples described below the on-off sequence may be chosen in various ways. FIG. 2E-2G describe various on-off sequences to obtain various torque outputs. These input sequences in these Figures fall in the category of pulse width modulated signals as the frequency of pulsing is kept the same but the width of the pulses vary. Only the graphs related to the class D are shown as the graphs related to the buck circuit are similar except for the difference of the available torque directions described above.

FIG. 2E describes the same situation described in FIG. 2D except instead of the clutch on-off times, graph 600 relates the input speed to the output speed for the class D case. During T1 for example, the positive (direct) input is switched in and during T2, the negative input is switched in. Since all the time intervals are the same, the average output speed illustrated by the dashed line at 605, is zero. The frequency of the pulsing is 1/(T1+T2) as all the intervals including T3 and T4 are assumed equal.

FIG. 2F describes a situation where the positive rotation is switched in for a longer time than the reversed rotation while the frequency of the pulsing is kept the same as in FIG. 2E. As illustrated, T1 is 75% of the interval T1+T2 although the frequency of pulsing is still 1/(T1+T2), assuming that T3 is equal to T1 and T4 is equal to T2. In this case, the average output speed as illustrated by the dashed line 615 may be equal to half the positive input speed.

FIG. 2G describes a situation where the positive rotation is switched on for almost the whole interval T1+T2. The average output speed as illustrated by the dashed line 625 is almost equal to the positive input speed. The frequency of pulsing is still 1/(T1+T2).

Thus 2E-G illustrate various cases of pulse width modulated schemes. Pulse frequency modulation may also be employed and this is explained in relation to the buck circuit for simplicity.

Pulse Frequency Modulation

FIGS. 2H and 2I illustrate the example of using pulse frequency modulation for the buck circuit. Here, between the two graphs 630 and 640, the width of the pulse T1 is kept the same but the frequency which is 1/(T1+T2) is varied. T3 is equal to T1 and T4 is equal to T2 in both graphs. In graph 630, the average output speed is shown as 635 and in graph 640, the average output speed is shown as 645. The average output speed in graph 640 is lower as the off times are larger than the on times. The interval T1+T2 may be varied, keeping the pulse width the same at T1. Thus this scheme is called pulse frequency modulation as the interval is varied but the width of the pulse is kept the same. The same type of scheme may be applied to the class D circuit as well and is illustrated in FIGS. 2J and 2K.

In FIGS. 2J and 2K, graph 650 illustrates a first on-off sequence for the class D analog. The first clutch is turned on at interval T1 whereby the shuttle may assume the speed of the clockwise input. At interval T2, the second clutch may be turned on whereby the shuttle may assume the speed of the counterclockwise input. As illustrated in graph 650, T1 may be equal to T2. And the frequency is 1/(T1+T2). In comparison, referring to graph 660 of FIG. 2K, the width of the pulse T1 remains the same except here T3 is larger than T2 of graph 650. Hence the frequency of the sequence in graph 660 which is 1/(T1+T3) is smaller than the frequency of the sequence in graph 650. This scheme as before with the buck circuit, is also called pulse frequency modulation as applicable to the class D circuit.

Figure 3A:
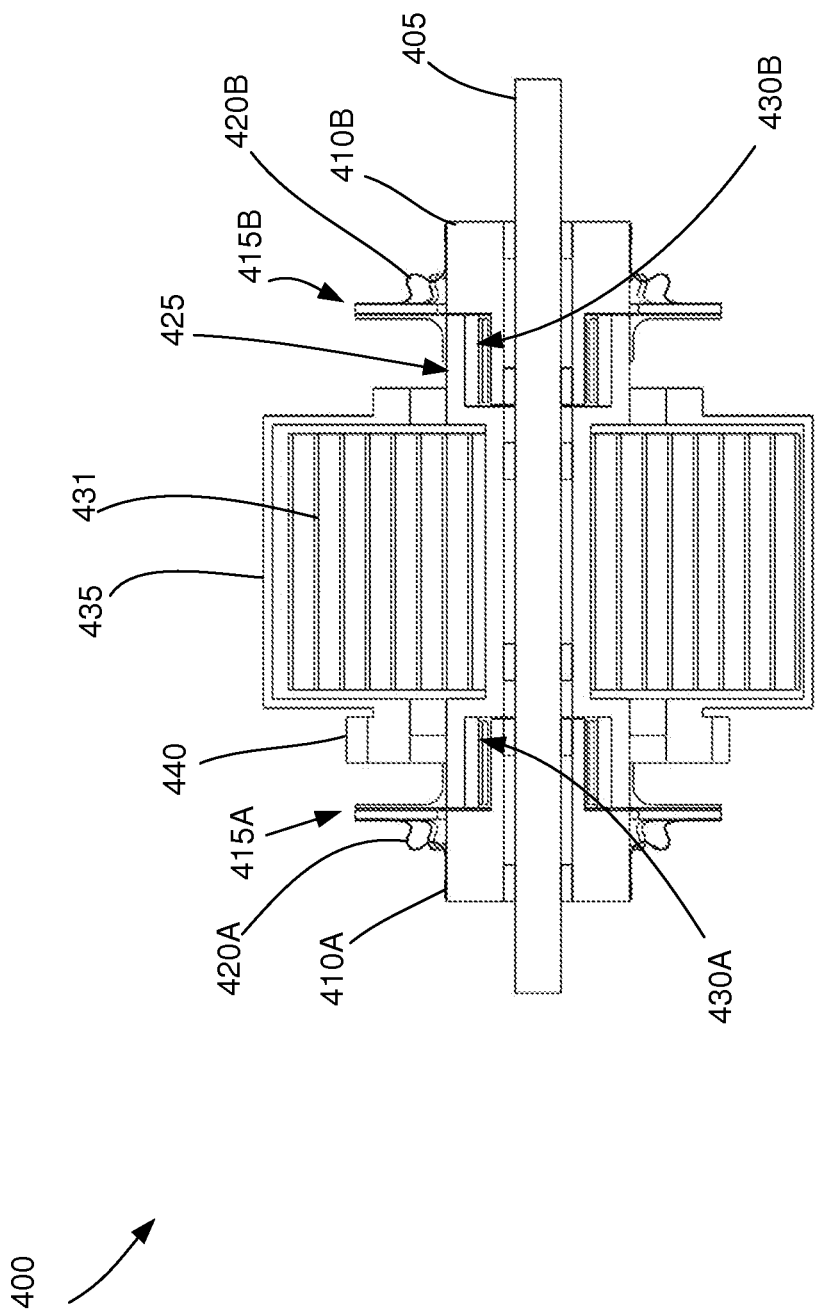
FIG. 3A is a cross-sectional view of a class-D mechanical analog.
Figure 3C:
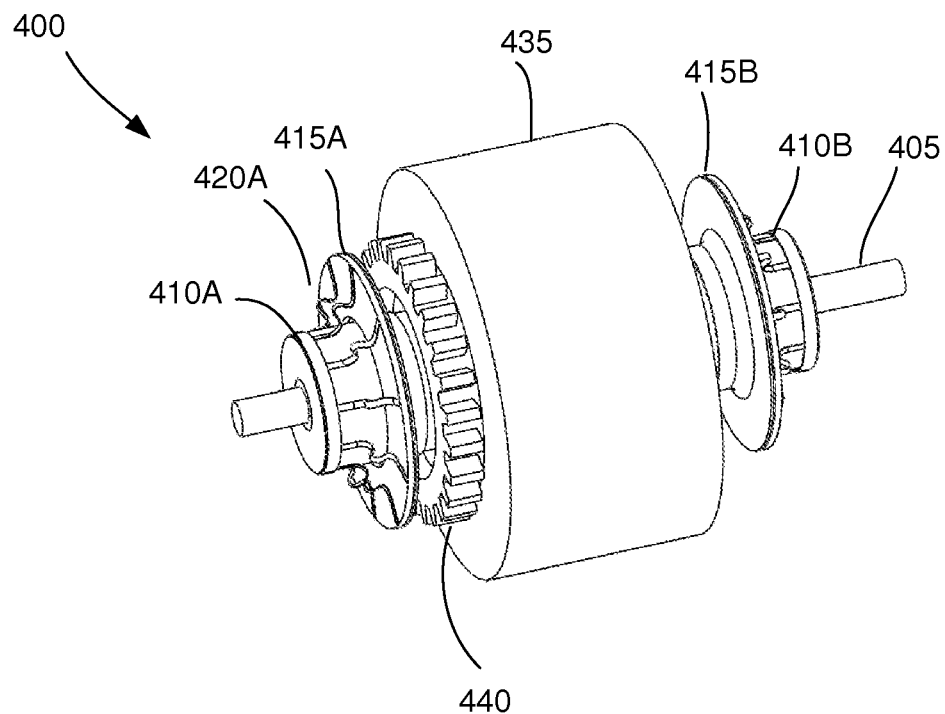
FIG. 3C is a perspective view of the device in FIG. 3A.

In another example, it may also be possible to use a hybrid of the pulse width modulation and a pulse frequency modulation schemes Mechanical Analog of the Class D Amplifier FIG. 3A-C illustrate device that is a mechanical analog of a class D amplifier. FIG. 3A is a sectional view, FIGS. 3B and C are perspective views. In this device, there is a central shaft or a pilot shaft 405 that aligns the other components. There are two input hubs 410A and 410B corresponding to the V+ and V− inputs in FIG. 1B and also corresponding to 315A and 315B in FIG. 2B. These input hubs are where the output of a single constant speed motor may be coupled into the device, one input spinning in the direction of the motor and one input spinning in the opposite direction. Next, the device comprises of two electrolaminate disc clutches 415A and 415B analogous to the transistors (MOSFETs) 225A and 225B. Each clutch has two plates similar to the clutch described in the companion disclosures. In FIG. 3B, the two plates of each electrolaminate clutch are clearly visible. Since the electrolaminate clutches depend on physical contact when a voltage is applied across the plates, springs 420A and 420B are included to the outside plate of each clutch to allow for the motion of the plates towards each other when voltage is applied and to hold the outside plate at close proximity to the inside plates, when voltage is not applied. The electrical circuits that enable the functioning of the electrolaminate clutches are not shown. For each clutch, the circuit may provide a voltage potential across the two plates much as in how voltage is applied to a capacitor. There are a number of ways to apply voltage across the plates of each clutch. In one method, since the plates of the clutches rotate, electrical contact between the power supply such as a battery and each plate may be made with brushes or slip rings. In another approach, portions of the device 400 that are shown in between the two electrolaminate clutches, such as the shuttle 425 (described in detail below) may be used as a common electrical ground and connected via brushes or slip rings to a power source. Subsequently, the companion plates of each clutch may be connected via slip rings or brushes to the power source via switches and other necessary electrical components. Regardless of how voltage is applied across the plates of the clutches, the (mechanical) output of each electrolaminate clutch is applied to one way clutches 430A and 430B which correspond to the diodes 230A and 230B. These clutches are arranged so that the shuttle may rotate in either direction but only as fast as the speed of the drive motor. The function of these clutches will become more apparent as more elements of the device 400 are described.

The device 400 has a shuttle 425 which can spin about the pilot shaft 405. The shuttle is coupled to a torsion spring 431 as is seen clearly on FIG. 3B, though other forms of bias member may be utilized. The outer end of the spring is coupled to and contained within a spring case 435. The shuttle, the spring and the spring case can all rotate about the pilot shaft 405. The spring is analogous to the inductor 235 in FIG. 2B. The final output hub of the device is the gear 440. This is analogous to 236 where the load resistor 240 is attached. The analog of the capacitor is not shown in FIG. 3A-C however, if needed, a flywheel (the analog of a capacitor) may serve as an output.

Figure 3D:
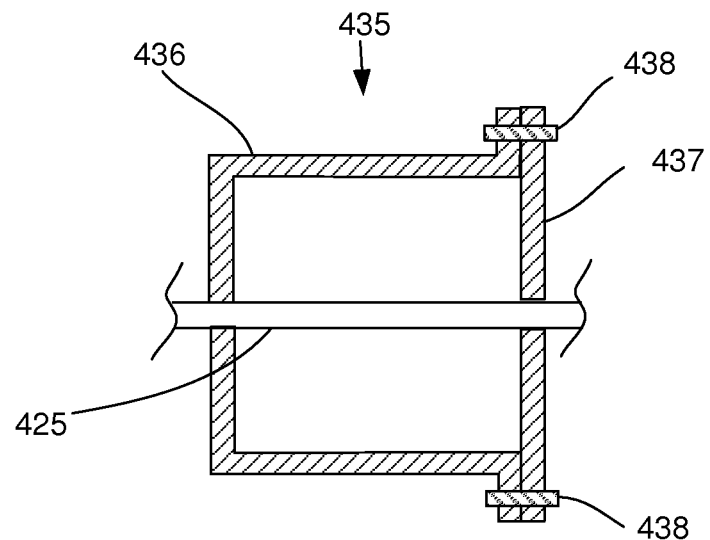
FIG. 3D is a cross-sectional view of a spring case.

For clarity, FIGS. 3 A-C does not show the detail of the spring case 435 but this is now illustrated in FIG. 3D. The spring case may consist of a hollow chamber 436 through which the shuttle 425 and the pilot shaft 405 may pass co-axially. The spring (not shown in the Figure) is coupled at one end to the shuttle 425 and to the walls of the hollow chamber 436 at the other end. The hollow chamber may have a lid 437 which contains the spring within the hollow chamber. The lid may be coupled to the hollow chamber by bolts 438. The output gear 440 may be coupled to the spring case subsequently to either side of the hollow chamber. As stated earlier, the device 400 has two inputs which rotate in opposite directions. Each input may be coupled to the shuttle by activating the corresponding electrolaminate clutch 415A or 415B. For example, clutch 415A may couple the input at 410A and clutch 415B may couple the input at 410B.

Clutch 415A includes disk pair 416A and 417A and clutch 415B includes disk pair 416B and 417B, which form electrically controllable clutches. Depending upon the technology used, one or both of the disks in each disk pair may be electrically activated to increase traction between the disks of the disk pair and engage the clutch 415A or 415B. If electroadhesion is utilized, one disk of each disk pair may be activated to produce traction, as discussed in further detail with respect to FIGS. 10A and 10B.

Noting that only one clutch may be engaged at any instant of time, an explanation of the sequence of events when one clutch is engaged is now described. The sequence of events when the other clutch is engaged is similar. Also, for the sake of clarity, the input at 410A is assumed to be a positive or clockwise input provided by a constant speed motor (not shown in the Figure) also spinning clockwise or in a positive direction. The actual direction of the input whether it is clockwise or anticlockwise is not material to this discussion as long as it is understood the other input 410B is rotating opposite of the input at 410A. Assuming that input hub 410A is coupled directly to a constant speed motor, when clutch 415A is engaged (and 415B is not engaged), it couples the direct input to the shuttle.

The spring winds up in the direction of the input rotation which is clockwise according to the assumption above. In this phase when clutch 415A is engaged, the spring may store energy and may also drive a load connected to the output gear 440. The load may experience a rising torque in the direction of the motor rotation (positive or clockwise) as illustrated in FIG. 2D, graph 339. Next, if the clutch 415A is disengaged and the clutch 415B is engaged, the spring unwinds and begins winding up in counterclockwise or negative direction, decreasing the torque in the clockwise direction and subsequently applying a torque in the counterclockwise or negative direction. Thus as explained earlier, by choosing the on-off sequence of the clutches appropriately, any desired torque between the maximum and minimum limits of torque may be obtained. The function of the one-way clutches is now further described.

Returning back to the scenario when the electrolaminate clutch 415A is engaged and the electrolaminate 415B is disengaged, the one way clutch 430A allows the electrolaminate clutch 415A to drive the shuttle in the direction of the clockwise input rotation as assumed in the example above. Thus the spring winds up in a clockwise direction. The other end of the shuttle closest to the counterclockwise or negative input, also has a one way clutch 430B but it does not prevent the shuttle from rotating clockwise next to the counter rotating half of the disengaged electrolaminate clutch 415B. However when the electrolaminate clutch 415A is disengaged and the electrolaminate clutch 415B is engaged, now both plates of the electrolaminate clutch 415B may move in a counterclockwise direction, opposite of the direction of the clockwise wound up spring. The clockwise wound up spring will now unwind in a counterclockwise direction however, it may unwind no faster that the speed of the counterclockwise rotating electrolaminate clutch 415B and the one way clutch 430B. The one way clutch 430A acts in the same way as above except with the relevant directions reversed—hence this explanation will not be provided. From the above explanation, the function of the one way clutches is now clear.

It was briefly mentioned above that in some cases a flywheel may serve as an output hub of the device 400. Two considerations regarding this arrangement are now provided. In the first consideration, referring to FIG. 1B, the electrical class D circuit incorporates a capacitor 255 connected between the amplifier output terminal 236 and the electrical ground 238. The mechanical analog of an electrical ground is inertial space. In other words, the position of the flywheel (which serves as the analog of the capacitor) is measured in relation to a fixed frame of reference. All other inertial components of the system may also be referred to this common reference frame. In FIG. 1B, the common ground is denoted by 238.

In the second consideration, a flywheel has been described earlier as the mechanical analog of the capacitor. The flywheel may simply be viewed as a component that has inertia. In a typical robot, referring to FIG. 2B, the output terminal 236 (a rotating shaft for example), may be connected to the remainder of a robot DOF. Typically this may comprise a gear train followed by a robot limb (e.g. an arm). A robot arm may or may not be carrying an inertial load, and may experience additional viscous loads which are directly analogous to the resistive load 240 of FIG. 1B. All gear trains have rotational inertia and internal losses due to friction and lubricants. The inertia is analogous to a capacitor and the internal losses are analogous to a resistive load. In addition, inertia of the arm together with any inertial load are effectively added (after an adjustment due to the gear ratio) to the transmission inertial. The viscous loads are added to the transmission losses. When all these effects are considered, depending on the specific requirements of the application, it may often be feasible to use a mechanism such as in FIG. 3A which does explicitly include a flywheel or viscous component. By excluding a flywheel, the weight, size and cost of the mechanism are reduced which is advantageous in general but specifically in the design and manufacture of robots. If the system with a single flywheel results in precession issues, a second flywheel may be coupled spinning in the opposite direction, thus reducing or eliminating precession.

Figure 4:
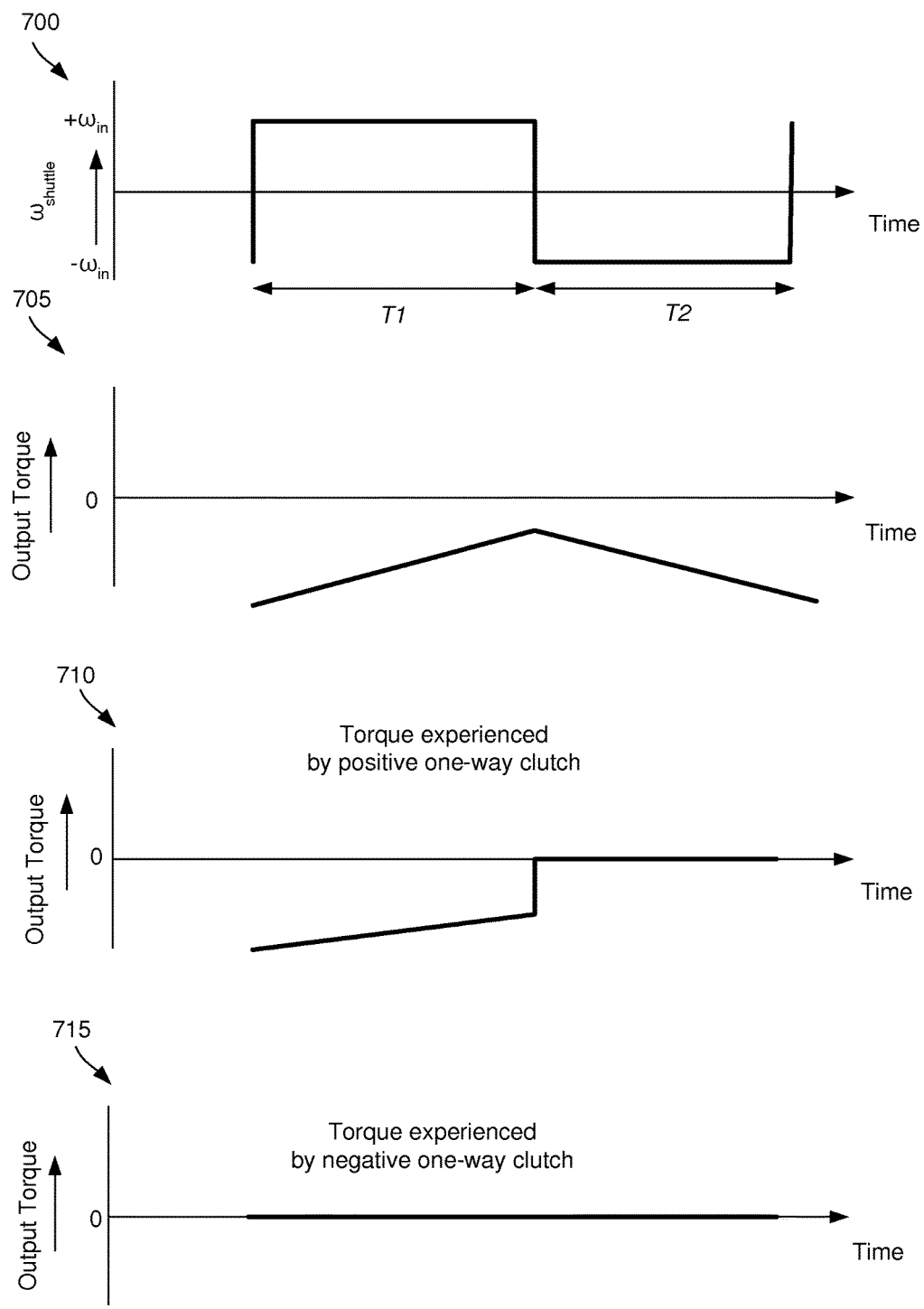
FIG. 4 is a set of graphs illustrating examples of output hub torque responses when a load is driving an output of a class D analog.

It is to be understood though that despite the discussion above regarding the advantages of not having flywheels, its use is not precluded in some applications Load Driving the Motor FIG. 2E-G illustrate graphs when the output gear 440 of device 400 is driving the load. With most robots, during certain tasks, the load may drive the motor via the transmission. This case is illustrated in FIG. 4 where four graphs 700, 705, 710 and 715 are shown. As graph 700 indicates, T1≅T2 such that $\omega_{out}\cong 0$ but $\omega_{out}>0$. During interval T1, in cases where the load may be driving the motor, the output speed may be positive but the output torque as shown in graph 705 may be negative which indicates that power flowing backwards. Another description of this condition is that instead of the constant speed motor applying power to the load through the device 400, the load is applying power back to the motor. This power may be utilized for example to charge a battery associated with the motor or to accelerate the motor to a higher speed. For convenience for the ensuing description referring to FIG. 3A, the left side of the Figure is called the positive side and the right side of the Figure is called the negative side. Thus the input hub 410A is called the positive input hub and the input hub 410B is called the negative input hub. The one-way clutch 430A is called the positive one-way clutch and the one-way clutch 430B is called the negative one-way clutch.

During time interval T1, as graph 700 indicates, the shuttle speed will assume the speed of one of the input hubs. The graph 700 indicates that the shuttle assumes the speed of the positive input hub during time interval T1. During this time interval, the spring 431 of FIG. 3A will be winding because the speed of the shuttle is $+\omega_{in}$ and the speed of the output hub is nearly zero. Thus the net rotational velocity of the spring is $\omega_{shuttle}-\omega_{out}$. In addition, in this case, the spring transmits the output torque to the output, which exerts this same torque on the load. Due to the negative output torque with the speed of the shuttle equal to the speed of the driving motor, the positive one-way clutch is engaged, transmitting a torque roughly equal to the output torque. This is shown in graph 710 during T1. This clutch torque is then subsequently experienced by the motor. As a result, the motor, in the absence of any other torques such as those caused by the motor drive signals, will accelerate. Thus, energy is transferred from the load to the motor, increasing the motor kinetic energy. During this time T1, the negative one-way clutch (or the clutch associated with the negative input hub) will not experience a torque as it is designed to be disengaged when the shuttle speed is more positive than $-\omega_{in}$.

The energy that is transferred to the motor may be used in either of the two methods described below or in combination: In the first method, the kinetic energy may be used in a subsequent movement of the robot so that less battery energy is used. For example, a robot doing a deep knee bend, energy that is recovered from the load on the way down is stored as kinetic energy in the motor rotor. Then, when the robot is moving up, the kinetic energy is used to lift the load against gravity. In a second method, the energy may be used to recharge the battery as the motor acts as a generator. Most conventional robots are able to accomplish the second method described above however, the class D analog mechanism described in this disclosure can accomplish both the methods.

For completeness, the behavior of the device during time T2 is now described. During this time, the negative electrolaminate clutch is engaged. This clutch forces the shuttle velocity to be $-\omega_{in}$, the speed of the negative input hub. Due to this shuttle speed, the positive one-way clutch is disengaged and its torque is zero as shown in graph 710. During time T2, the negative shuttle torque is provided by the motor via the negative electrolaminate clutch. This torque is not shown in FIG. 4.

Hence in certain situations for example in a humanoid robot which may be run on battery power, generating energy to extend the battery life may be advantageous and the above example may be a way to realize this advantage.

Dead Time

Figure 5A:
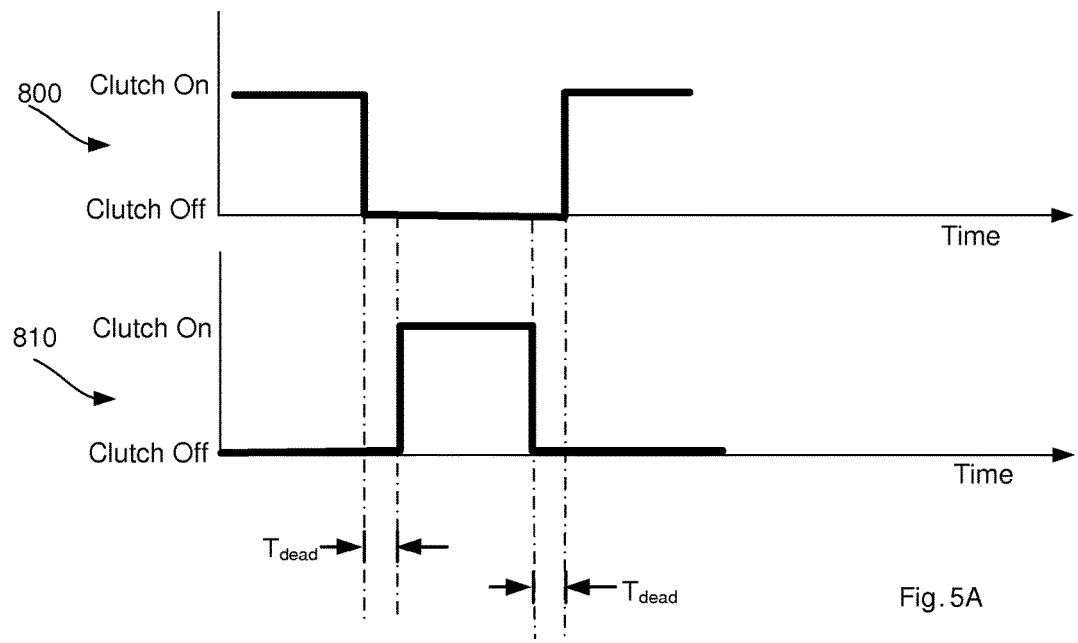
FIG. 5A is a graph illustrating dead times in the operation of a clutch.

As with any circuit or mechanism, the ideal behavior of the electrolaminte clutches and their practical behavior differ in some aspects. In particular, as with all clutches of any type, the electrolaminate clutch may have an engagement or a disengagement delay. In other words, there may be a time delay between when an electrical signal is sent to engage the clutch and when the clutch is mechanically engaged. Similarly, there may be a delay between when an electrical signal is sent to disengage a clutch and when the clutch is actually mechanically disengaged. Some other characteristics of the time delays are that the engagement and disengagement delay may not be equal to one another. Further, the engagement (or the disengagement) delay may differ from one engagement (or disengagement) to another. There are several consequences of these time delays. One consequence is that if these delays are not accommodated for in terms of the on-off sequence of the clutches and if both clutches are effectively engaged at the same time, the result may range from a loss of efficiency to malfunction or destruction of the device. To avoid these consequences, a "dead time" may be purposely introduced in the on-off sequence of the clutches such that an engaged clutch is mechanically disengaged before an electrical signal is provided to the disengaged clutch for it to engage. FIG. 5A illustrates this example. The graph 800 illustrates a first clutch going from an engaged state to a disengaged state. A period of time illustrated as $T_{dead}$ is allowed to elapse before the clutch in graph 810 is turned on. Although these graphs show ideal behavior of the clutches in that they turn on and off instantaneously, the approach is that $T_{dead}$ may be adjusted to accommodate the engagement and disengagement delays of the clutches. The dead time may be about 0.5 to 10 msec. but other values are possible. Further, this value may be chosen based on the detailed understanding of the behavior of the clutches and other members of the device 400 as described below.

Referring to FIG. 3A, the situation when clutch 415A is engaged and 415B is disengaged is now considered. The situation when 415B is engaged and 415A is disengaged is essentially identical in concept and will not be described. First and electrical signal to disengage the clutch 415A is applied. After a dead time interval, a signal to engage clutch 415B is applied. Based on the disengagement delay of clutch 415A, this clutch becomes mechanically disengaged and the shuttle 425 is able to rotate freely. Assuming that the spring was wound up clockwise when 415A was engaged, when it becomes disengaged, the spring will unwind in the counter-clockwise direction, and apply a negative torque (in the counter-clockwise direction) on the shuttle. The shuttle will experience a rapid negative acceleration under the influence of the spring until it reaches the counterclockwise speed of the input hub 410B. At this point, one-way clutch 430B will engage constraining the shuttle to rotate at the same speed as the input hub 410B. Now, while clutch 430B is engaged, clutch 415B will mechanically engage after its own engagement delay has elapsed. At the instant of mechanical engagement, the velocity difference of the two plates of clutch 415B may be zero or close to zero. As a result of this, the energy lost due to clutch friction is zero or close to zero and the clutch wear should be minimal. Hence using the above discussion as a guideline, $T_{dead}$ may be advantageously chosen to ensure that the on-off sequence of clutch engagement and disengagement results in maximizing mechanism lifetime and efficiency.

Figure 5B:
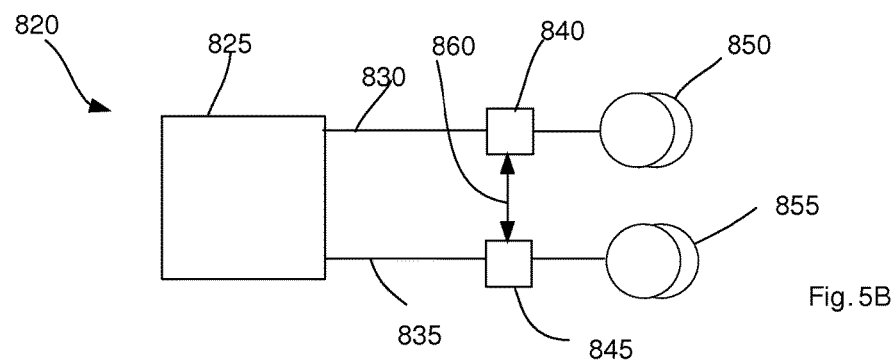
FIG. 5B is a circuit diagram illustrating an example of a circuit that avoids both clutches from being activated at the same time.
Figure 5C:
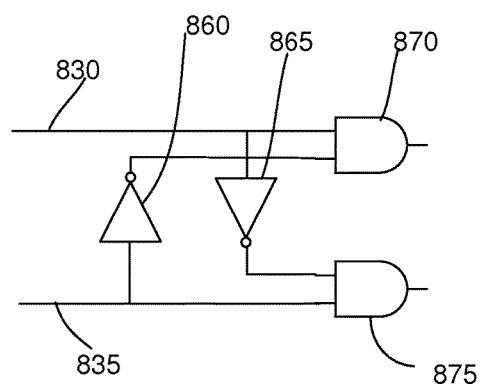
FIG. 5C is a circuit diagram illustrating another example of a circuit that avoids both clutches from being activated at the same time.

Some methods are now described to ensure that both clutches are not engaged at the same time. In FIG. 5B, a computer 825 generates a pair of on-off sequences and outputs these sequences via outputs 830 and 835. The outputs 830 and 835 are each coupled to hardware circuits 840 and 845 which may also communicate with each other as illustrated by the bidirectional arrow 860. The input hub of the hardware circuits may then be coupled to clutches 850 and 855 (or alternatively clutches 415A and 415B of device 400). In a first variation of this example, the computer program may simply ensure that the on-off sequence is appropriate and the two clutches are never turned on at the same time. However, to provide a failsafe method, the hardware circuits may ensure that only one clutch 850 or clutch 855 may be turned on at any one time. Various well known methods are known to achieve this type of result. FIG. 5C illustrates just one method. Each of the two outputs 830 and 835 from the computer may be coupled to an inverter. Thus, output 830 may be coupled to inverter 865 and output 835 may be coupled to inverter 860. The output of the inverters may be input to one end of a AND gate. Thus AND gate 870 may perform a logical AND operation between output 830 and an inverted output 835. Similarly, AND gate 875 may perform a logical AND between output 835 and an inverted output 830. The output of the AND gates are used to activate clutches 850 and 855 on (or alternatively clutches 415A and 415B of device 400). The configuration in FIG. 5C ensures that when both outputs 830 and 835 are high, the outputs of the AND gates are low, which is a permissible state for the operation of the device 400 of FIG. 3A.

Alternate Constructions of the Mechanically Switching Variable Transmission

Figure 6A:
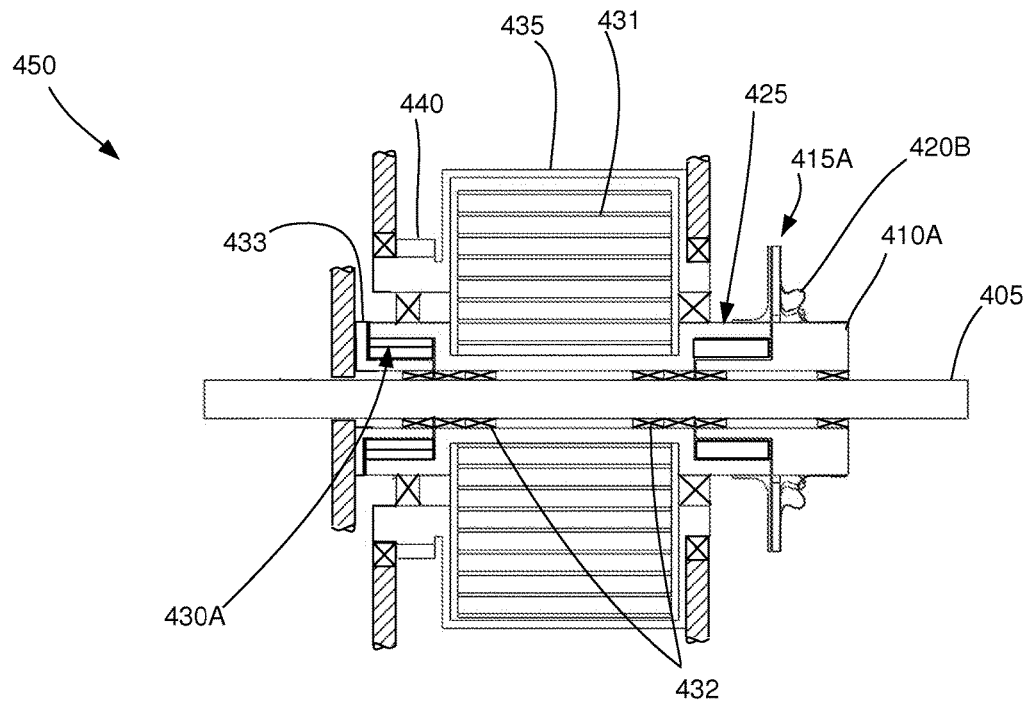
FIG. 6A is a cross-sectional view of an example of a mechanical analog to a buck circuit.
Figure 6B:
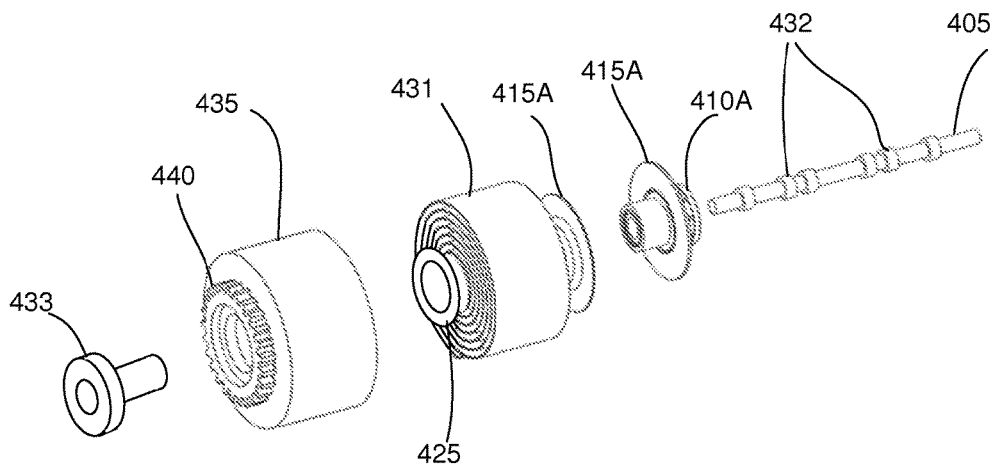
FIG. 6B is an exploded perspective view of the device in FIG. 6A.

FIG. 3A-C illustrate the mechanically switching variable transmission which as stated above is the mechanical analog of the class-D amplifier. It was also stated above that a buck circuit is a close relative of the class D circuit and the two circuits were described in FIGS. 1A and 1B. Now in another example, a device based on the buck circuit is illustrated in FIGS. 6A-B. As expected, this device is similar to device 400 of FIG. 3A. To emphasize the similarity in the devices 400 of FIG. 3A and 450 of FIG. 6A, components that are similar between the two devices have been given the same enumeration. Due to the similarity between the two devices, the differences will be described below. The device 450 of FIG. 6A, the buck circuit analog, may have only one input hub shown at 410A. Consequently, the device 450 may provide torque only in one direction. Since there is only one input hub, the device 450 may have only one electrolaminate clutch and only one one-way clutch which are shown as 415A and 430A. On the other side of the device (opposite of the side which has the input hub), the device 450 has an output gear or hub 440 just as in the device 400, which in this case only rotates in one direction. Also just as in the device 400, the device 450 has a shuttle 425 which rotates on bearing 432. As seen in FIG. 6A, at the left end of the shuttle, a one-way clutch 430B is mounted so that it operates between a non-rotating collar 433 and the shuttle. This is analogous to the diode 160 of FIG. 1A. FIG. 6B shows an exploded view of the device in FIG. 6A. The functioning of the device 450 has been described earlier and is similar to the functioning of the device 400 (class D analog) except for the available directions of torque and rotation. In addition, the application of voltage across the plates of the electrolaminate clutch 415A is accomplished in a similar manner as in device 400 of FIG. 3A.

Devices which Use Alternate Types of Clutches

Figure 6C:
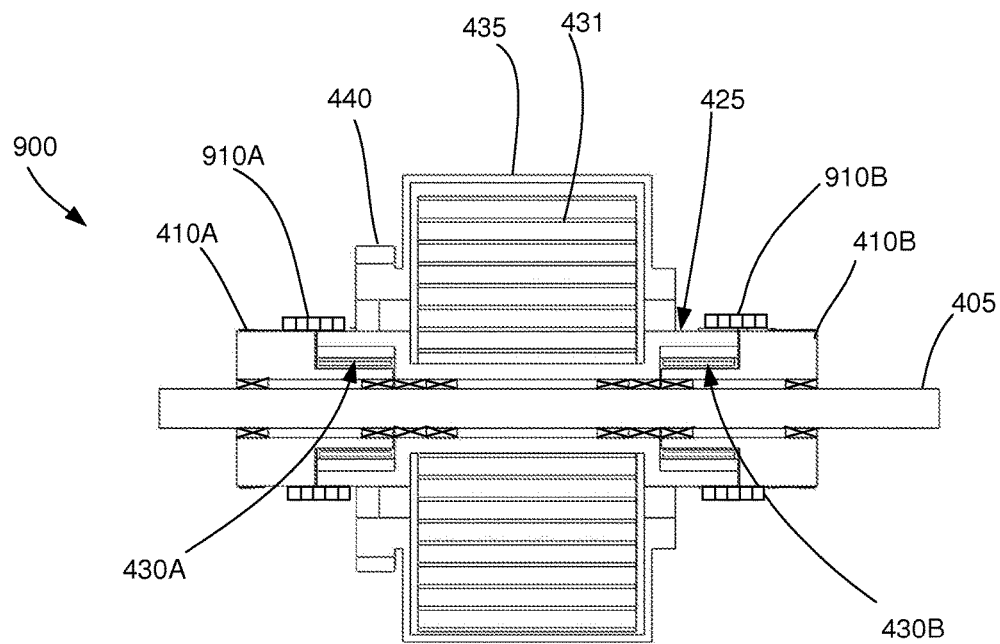
FIG. 6C is a cross-sectional view of an example of a mechanical analog to class D circuit using wrap spring clutches.
Figure 6D:
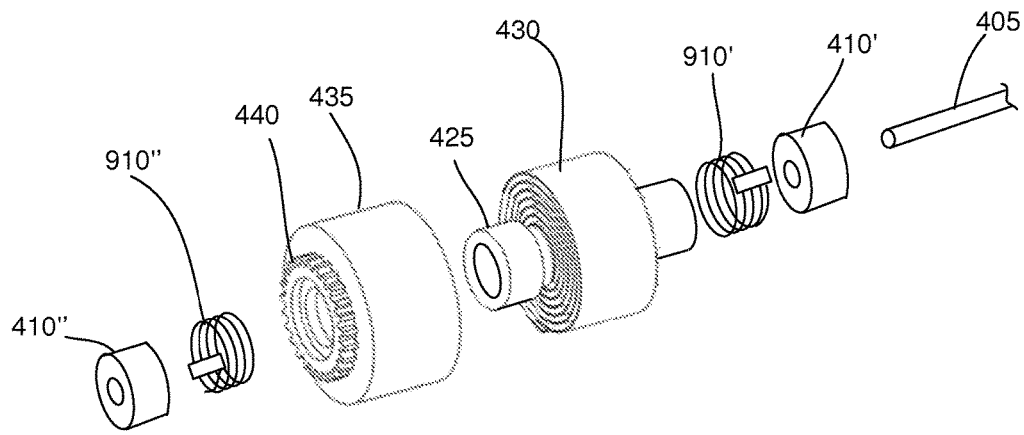
FIG. 6D is an exploded perspective view of the device in FIG. 6C.

In another example, the devices 400 and 450 may use alternate types of clutches other than the electrolaminate enabled clutch. As an example, these devices may use wrap spring clutches as described in FIGS. 6C and 6D. The device 900 is similar to device 400 of FIGS. 3A-C except the device 900 is shown using wrap spring clutches. The wrap spring clutches are shown as 910A and 910B and may couple two shafts when activated. As the device 900 is class D analog, it has two inputs 410A and 410B. On the left side of FIG. 6C, the wrap spring clutch 910A couples the input 410A and the shuttle 425. Similarly on the right side of the Figure, the wrap spring clutch 910B couples the input 410B and the shuttle 425. All other details remain the same between device 400 and device 900. It must also be noted that the buck circuit analog illustrated in FIGS. 6A-B may also use the wrap spring clutch instead of the electrolaminate disc clutch. As in devices 400 and 450, the electrical activation of the wrap spring clutches may be accomplished via slip rings or brushes.

Combination of Buck Circuit Analogs

Figure 7A:
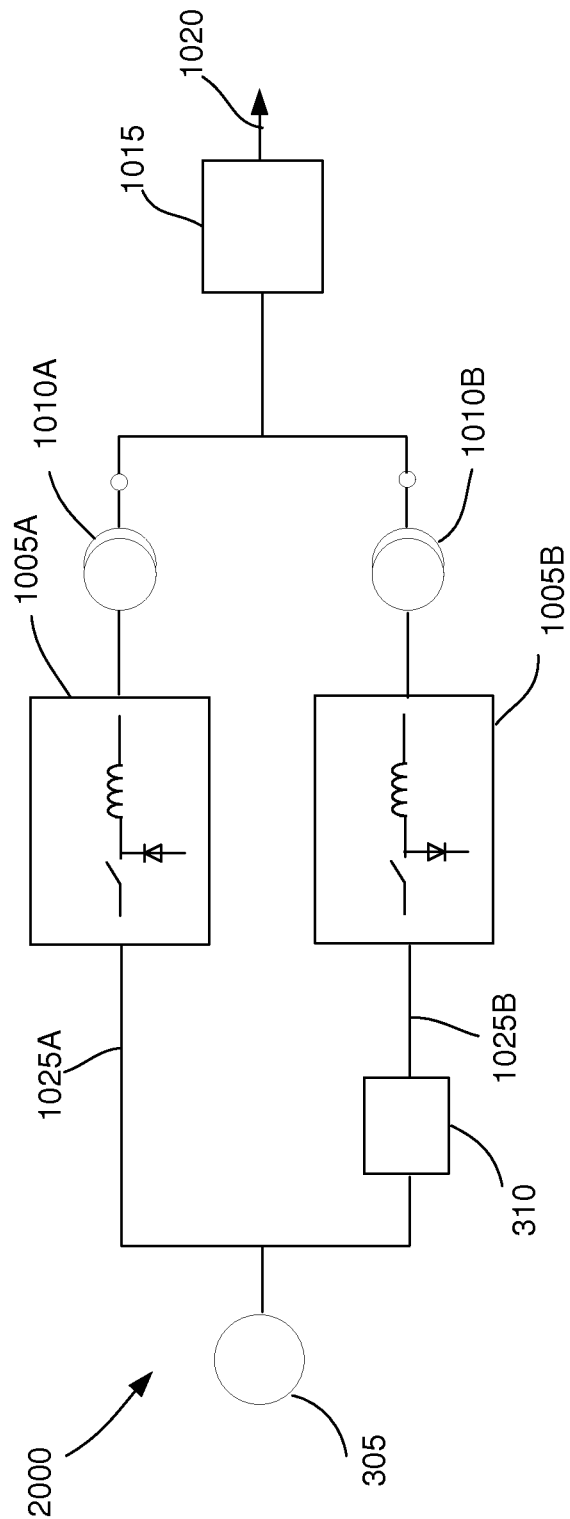
FIG. 7A is a representation diagram illustrating an example of a configuration of a buck circuit mechanical analog.

In another example, two buck circuit analogs may be used in a mechanical circuit to achieve a method to pull in two directions. Pulling in two directions is an advantageous feature in many situations such as but not limited to an arm of a robot where the arm may need to be controlled in opposite or antagonistic directions. FIG. 7A illustrates one variation of this example. Many of the components in FIG. 7A are similar to the components in FIGS. 2A and B and thus the same enumeration is utilized. 305 is a constant speed motor and 310 is a reversing gear. 1005A and 1005B are mechanical analogs of the buck circuit and are similar to 322 in FIG. 2A however a different enumeration is used for clarity of explanation. 1010A and 1010B are clutches which may couple the output of 1005A and 1005B to the step-down transmission 1015. The final output of this arrangement is shown as 1020, which may be an output hub. The clutches 1010A and 1010B may be of the types described in this disclosure such as the electrolaminate disc clutch or the wrap spring clutch. It may be of other types as well such as those available commercially. The inductors in 1005A and 1005B correspond to springs and the diodes correspond to one-way clutches as described earlier. For clarity the output 1025A of the motor 305 may be assumed to be clockwise and the output 1025B may be assumed counterclockwise. The actual directions may be reversed and is immaterial to the ensuing discussion. The arrangement in FIG. 7A illustrates that with two buck circuits, the final output hub 1020 may be caused to move in a clockwise or a counterclockwise direction. When the buck circuit analog 1005A is turned on and 1005B is turned off, output hub 1020 may move in a clockwise direction. Similarly when the buck circuit analog 1005B is turned on and 1005A is turned off, output hub 1020 may move in a counterclockwise direction. The function of the clutches 1010A and 1010B is now described. The function of these clutches is described with a specific example of when the buck circuit 1005A is turned on and 1005B is turned off. In this situation, the clockwise input is coupled to the output hub 1020. However in this situation if clutch 1010B is not disengaged, the one-way clutch in 1005B will prevent the output hub from turning in the clockwise direction. The situation is similar with regards to the output hub moving in the counterclockwise direction. Thus, to cause the output hub 1020 to rotate in any specified direction, the clutch associated with the other direction needs to be disengaged. The speed of rotation of the output hub will depend on the pulse sequence applied to the buck circuit analog 1005A and 1005B. To stop the output hub 1020 from rotating, if 1005A and 1005B are turned off but if the clutches 1010A and 1010B are left engaged, the one-way clutches in 1005A and 1005B will prevent the output hub 1020 from rotating. Thus it is clear how two directions of rotation may be achieved with the arrangement described above.

Figure 7B:
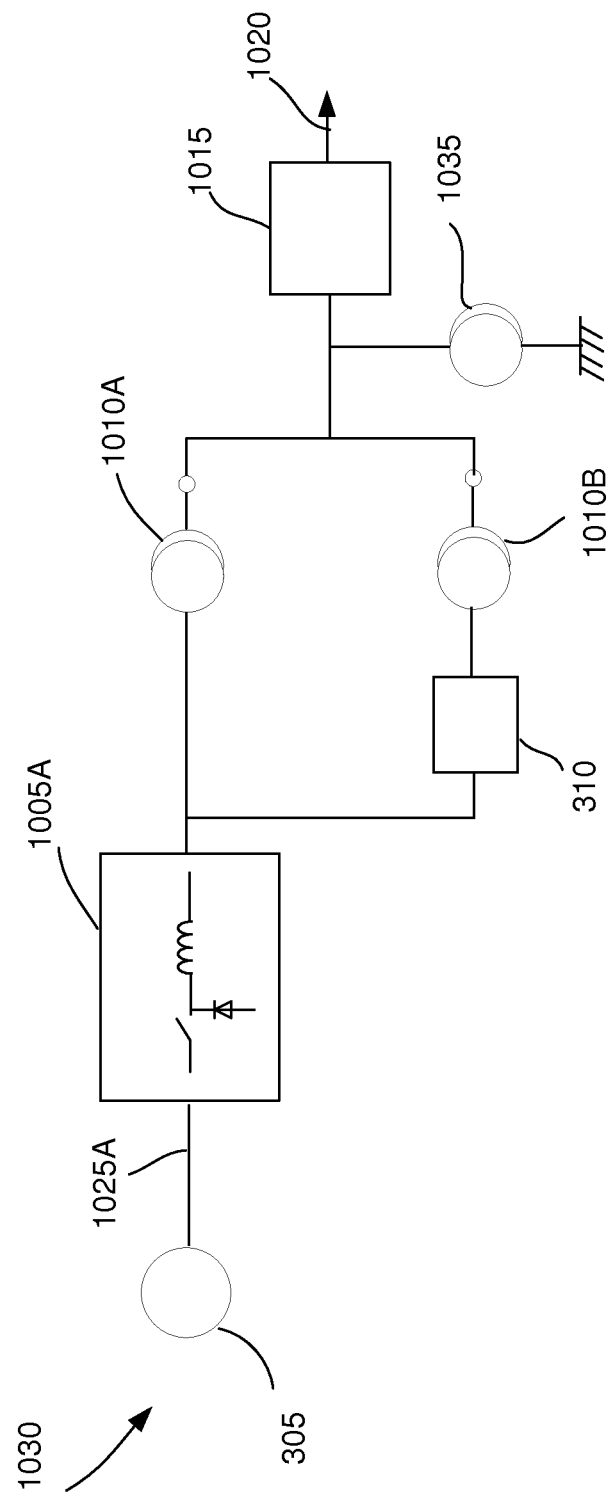
FIG. 7B is a representation diagram illustrating another example of a configuration of a buck circuit mechanical analog.

In yet another example, pull in two directions may be achieved by the arrangement shown in FIG. 7B. In this case only one buck circuit analog 1005A is coupled to the clockwise output 1025A of the constant speed motor. One output of the buck circuit analog 1005A is then subsequently coupled to a clutch 1010A. However the output of the buck circuit is also coupled to a reversing gear 310 which is then coupled to another clutch 1010B. Thus the final output hub 1020 may be caused to move in the clockwise or counter-clockwise direction depending on which of the two clutches 1010A or 1010B is turned on. Clutch 1035 is illustrated in the Figure such that one side of the clutch is coupled to ground. This clutch enables the configuration 1030 to stop the output hub 1020 from rotating. Additionally, the speed of rotation of the output hub will depend on the pulse sequence applied to the buck circuit analog 1005A. Thus it is clear how two directions of rotation may be achieved with the arrangement described above.

Figure 7C:
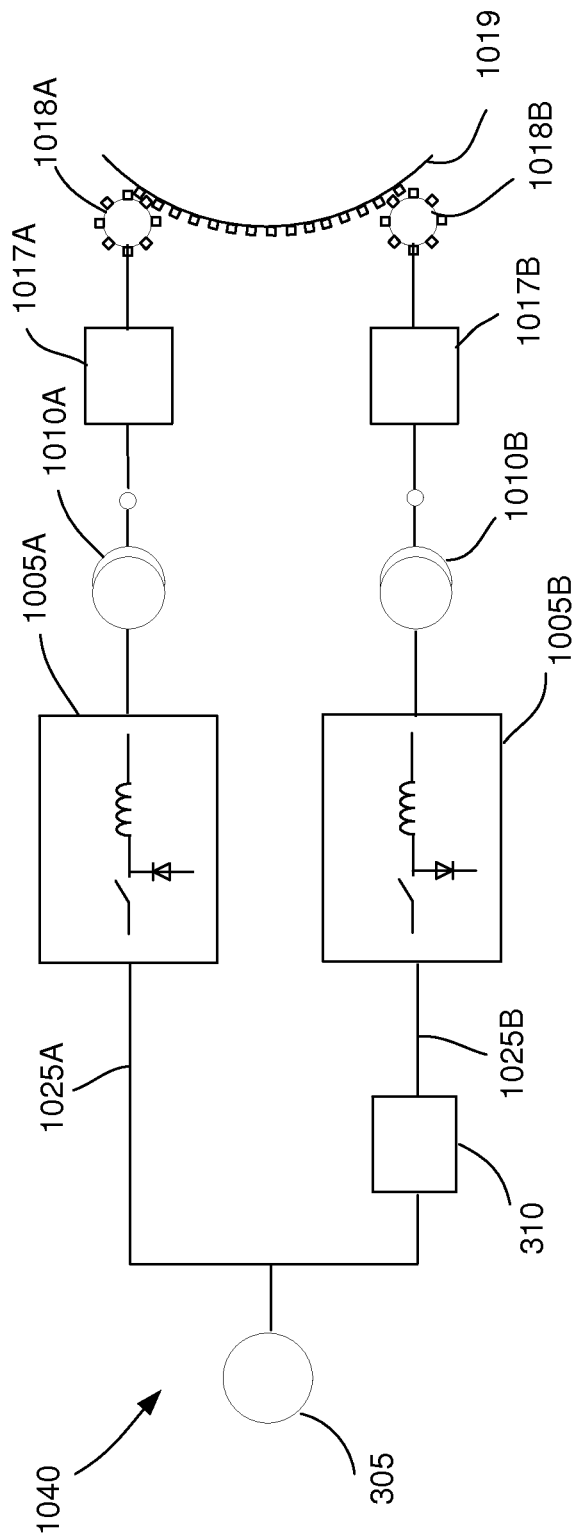
FIG. 7C is a representational diagram illustrating an example of a no-backlash system using two buck circuits.

In yet another example, in a variation of the configuration 2000 illustrated in FIG. 7A, another configuration is illustrated in FIG. 7C. In this configuration, backlash may be eliminated. Two step down transmissions 1017A and 1017B are provided in this configuration where the output of each step down is coupled to small gears 1018A and 1018B. Both small gears are coupled to one large gear output hub 1019. Elimination of backlash is now described with a specific example. Assuming that the buck circuit 1005A is turned on and couples the clockwise output of the motor 305 to the small gear 1018A, the output gear 1019 will turn counter-clockwise. In this example, the small gear 1018B may be also turned on but with a small torque. Thus by driving one small gear in one direction with a large torque and by driving the other small gear in the opposite direction with a small torque, backlash may be eliminated.

Mathematical Analysis and Procedure for Spring Design

Figure 8A:
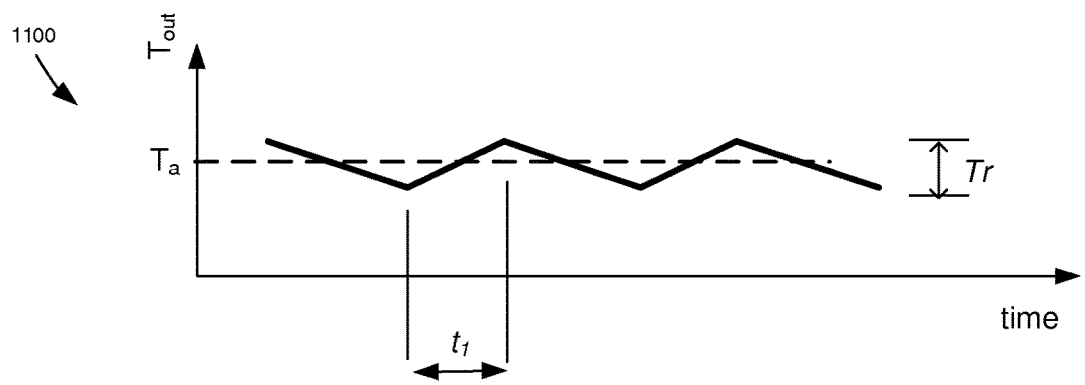
FIG. 8A is a graph illustrating an example of output hub response.

Additional examples are described in later sections based on the mathematical analysis below. Different cases are considered so that the device 450 may be better designed. For the following mathematical analysis, the following nomenclature will be used:

$\omega_{in}$ Input speed of transmission
$\omega_{out}$ Output speed of transmission
$T_{in}$ Input torque of transmission
$T_{out}$ Output torque of transmission
$T_r$ Torque ripple
$T_{max}$ Maximum torque at transmission output
c Fraction relating $T_r$ to $T_{max}$
$t_1$ Minimum engagement time of clutch
$t_2$ Minimum disengagement time of clutch
k Spring constant of torsion spring
$\sigma_{max}$ Maximum design stress in spring
E Young's modulus of spring
b Axial length of torsion spring
h Thickness of torsion spring
l Length of torsion spring
ρ Density of torsion spring material
$M_0$ Moment acting on the spring
Q Moment of inertia CASE1: $\omega_{out} \approx 0$ but $\omega_{out} > 0$ and $T_{out} = T_a$ where $T_a < T_{max}$. Referring to FIG. 8A, during the time $t_1$, the spring will be wound through an angle:

$$\theta = t_1 \omega_{in} \qquad \text{Eqn. 7}$$

The corresponding increase in torque is:

$$\Delta T = T_r = K\theta = kt_1\omega_{in} \qquad \text{Eqn. 8}$$

$T_r$ is the torque ripple and is illustrated in FIG. 8A. Smoother torque output will require that $T_r$ be a small fraction c of $T_{max}$. Typically c may be chosen in the range $0.01 \le c \le 0.1$ although other ranges are possible. Thus $$kt_1\omega_{in} = T_r < cT_{max} \qquad \text{Eqn. 9}$$

and $$k < \frac{cT_{max}}{t_1\omega_{in}} \qquad \text{Eqn. 10}$$

Figure 8B:
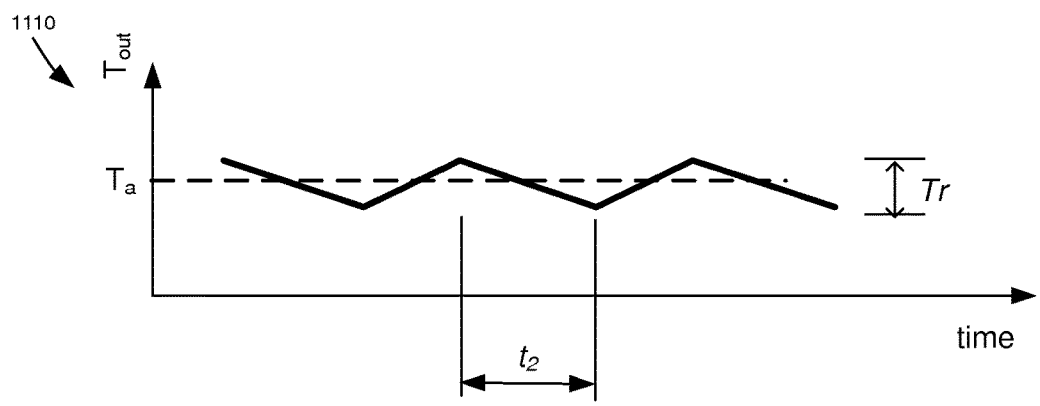
FIG. 8B is a graph illustrating another example of output hub response.

CASE 2: $\omega_{out} \approx \omega_{in}$ but $\omega_{out} < \omega_{in}$ and $T_{out} = T_a$ where $T_a < T_{max}$. Referring to FIG. 8B, during the time t2, the spring will unwind through an angle:

$$\theta = -t_2\omega_{out} \approx -t_2\omega_{in} \qquad \text{Eqn. 11}$$

The corresponding decrease in torque is:

$$\Delta T = T_r = K\theta = -kt_2\omega_{in} \qquad \text{Eqn. 12}$$

Using the same steps as in case 1, it can then be concluded that $$k < \frac{cT_{max}}{t_2\omega_{in}} \qquad \text{Eqn. 13}$$

Equations 10 and 13 indicate that if $t_2 \cong t_1$, the spring constant for case 2 will be similar to the value computed for case 1.

CASE3:

$$\omega_{out} = \frac{\omega_{in}}{2}$$

and $$t_1 = t_2$$

In this case, during engagement, one end of the torsion spring is rotating at ω=$\omega_{in}$ while the output end of the spring rotates at $$\omega = \frac{\omega_{in}}{2}.$$

Hence the net windup rate is:
Windup Rate:

$$\omega_{in} - \frac{\omega_{in}}{2} = \frac{\omega_{in}}{2} \qquad \text{Eqn. 14}$$

Similarly, during clutch disengagement, the unwinding rate is
Unwinding Rate:

$$-\frac{\omega_{in}}{2} \qquad \text{Eqn. 15}$$

Thus, the angle the spring unwinds is:

$$\theta = \frac{-t_2 \omega_{in}}{2} \qquad \text{Eqn. 16}$$

The torque ripple in this case is:

$$T_r = k\theta = \frac{k t_2 \omega_{in}}{2} \qquad \text{Eqn. 17}$$

It can be seen by comparing Eqn. 17 to Eqn. 8 and Eqn. 12, when $t_1=t_2$, the torque ripple is halved which is advantageous. As will be described below in some detail, the energy loss during the process of engagement and disengagement is proportional to the frequency of the pulses. This may be readily understood when $t_1=t_2$ however is not necessary for $t_1$ to be always equal to $t_2$. Thus by decreasing the frequency for example by halving it, the energy loss may be halved. Operating the devices when the torque ripple is halved and when the energy loss may be low, is an advantageous mode of operation.

Energy Loss in the Process of Engagement

To analyze the energy loss during engagement and disengagement, the following additional variables may be defined:

$I_s$ Combined inertia of the clutch driven disk, the shuttle and the end of the spring attached to the shuttle.

$T_e$ The torque that is transmitted by the clutch $\omega_d$ Speed of the driven disk $t_e$ Clutch engagement time Then during engagement, $$\frac{d\omega_d}{dt} = \frac{T_e}{I_s} \qquad \text{Eqn. 18}$$

Assuming that $\omega_{in}$ is constant regardless of the load imposed by the clutch, $\omega_d$ reaches $\omega_{in}$ after a time $t_e$ given by:

$$t_e = \frac{\omega_{in} I_s}{T_e} \qquad \text{Eqn. 19}$$

The assumption is consistent with a motor with large inertia. It is also to be noted that for these discussions, $t_e \ll t_1$.

During the engagement process that lasts for an interval equal to $t_e$ the energy supplied by the motor is power times duration. Thus:

$$\Delta E_{motor} = T_e \omega_{in} t_e = T_e \frac{\omega_{in}^2 I_s}{T_e} = I_s \omega_{in}^2 \qquad \text{Eqn. 20}$$

On the assumption that prior to engagement, the clutch disk and shuttle were at rest and after engagement, they spin with a velocity of $\omega_{in}$, the energy gained by the clutch/shuttle assembly may be given by:

$$\Delta E_{shuttle} = 0.5 I_s \omega_{in}^2 \qquad \text{Eqn. 21}$$

Based on Eqn 21, it can be concluded that the energy lost due to friction ($\Delta E_{eng.\ friction}$) must be:

$$\Delta E_{eng.friction} = \Delta E_{motor} - \Delta E_{shuffle} = \frac{I_s \omega_{in}^2}{2} \qquad \text{Eqn. 22}$$

From Eqn. 22, it can thus be seen that the energy loss due to friction is independent of the clutch engagement time $t_0$ or torque $T_e$. This is a consequence of the fact that the clutch engagement may be similar to an inelastic collision. For such a collision, the amount of energy lost is independent of the detailed time history of the collision itself.

Energy Loss in the Process of Disengagement

To analyze the energy loss during disengagement, the following additional variables may be defined:

$t_d$ Clutch disengagement time $T_d$ Torque exerted by the clutch during disengagement To analyze the energy loss due to clutch disengagement, an assumption that a fixed torque $T_d$ is exerted by the clutch needs to be made. Unlike the case for engagement, the disengagement time $t_d$ is not constrained by an equation such as Eqn. 19 for $t_e$. The variable $t_d$ is essentially a characteristic of the clutch. A further assumption that $t_d \ll t_1$ or $t_2$ is made to clarify the understanding of energy loss during disengagement. During this process of disengagement, the shuttle will not significantly decelerate during the interval $t_d$. However, to complete the analysis, another assumption needs to be made about the input-to-shuttle speed difference after the time interval $t_d$. To gain a conservative estimate about the energy loss during disengagement, an overestimation of the speed difference may be made. Another way to understand this scenario is that the shuttle does not loose appreciable speed after disengagement. Hence with these assumptions, the energy lost due to clutch friction during disengagement may be written as:

$$\Delta E_{dis.friction} \leq T_d \left( \omega_{in} - \frac{9\omega_{in}}{10} \right) t_d \qquad \text{Eqn. 23}$$

$$\Delta E_{dis \cdot friction} \leq \frac{T_d t_d \omega_{in}}{10} \qquad \text{Eqn. 24}$$

From Eqn. 19

$$t_e = \frac{\omega_{in} I_s}{T_e} \qquad \text{Eqn. 25}$$

On the assumption that $t_d = t_0$ and $T_d = T_e$ then $$t_d = \frac{\omega_{in} I_s}{T_e} \qquad \text{Eqn. 26}$$

Substituting Eqn. 26 in Eqn. 24

$$\Delta E_{dis \cdot friction} \leq \frac{T_d \left(\frac{\omega_{in} I_s}{T_e}\right) \omega_{in}}{10} \qquad \text{Eqn. 27}$$

$$\Delta E_{dis \cdot friction} \leq \frac{I_s \omega_{in}^2}{10} \qquad \text{Eqn. 28}$$

Comparing Eqn. 28 with Eqn. 22, the following equation may be written $$\Delta E_{dis \cdot friction} \leq \left(\frac{1}{5}\right) \Delta E_{eng \cdot friction} \qquad \text{Eqn. 29}$$

From Eqn. 29 it can now be seen that the energy loss at clutch disengagement may be small or negligible compared to energy loss during engagement. From the preceding analysis it can also be stated that energy loss due to clutching is proportional to $I_s$. Hence it may be advantageous to reduce the inertia $I_s$. Description of the examples related to low inertia shuttles will be described in later sections of this disclosure.

Procedure for Design of the Spring

The following procedure describes how to design a practical spring following the calculation of k from the above equations. From Kent's Mechanical Engineers' Handbook (Design and Production Volume, Twelfth Edition, 1950, Colin Carmichael, ed., pages 11-26 to 11-28) for a helical torsion spring, $$\theta = \frac{M_0 l}{EQ} \qquad \text{Eqn. 30}$$

Since $$k \equiv \frac{M_0}{\theta} \qquad \text{Eqn. 31}$$

Substituting Eqn. 30 in Eqn. 31 gives $$k = \frac{EQ}{l} \qquad \text{Eqn. 32}$$

From Kent's Handbook, $$Q = \frac{bh^3}{12} \qquad \text{Eqn. 33}$$

$$k = \frac{Ebh^3}{12l} \qquad \text{Eqn. 34}$$

Also from Kent's Handbook, $$\sigma_{max} = \frac{6M_0}{bh^2} \qquad \text{Eqn. 35}$$

Based on this the following method to design a spring may be followed.

Step 1: Pick an initial reasonable value for b.
Step 2: Compute h based on Eqn. 35

$$h = \sqrt{\frac{6M_0}{b\sigma_{max}}} = \sqrt{\frac{6T_{max}}{b\sigma_{max}}} \qquad \text{Eqn. 36}$$

Step 3: If h is unreasonable for the application, pick a new b and repeat step 2; otherwise proceed to step 4.
Step 4: Compute l $$l = \frac{Ebh^3}{12k} \qquad \text{Eqn. 37}$$

Low Inertia Shuttle

Returning back to Eqn. 22, it was illustrated that the energy loss due to engagement of the clutch is proportional to the inertia of the shuttle. Thus it is advantageous to minimize inertia of the shuttle. As seen in FIG. 3A, one end of the torsion spring 431 may be coupled to the shuttle 425 and may move with it. For convenience, the end of the spring coupled to the shuttle may be called the "inboard end". The other end of the spring may be coupled to the spring case 435. For convenience, the end of the spring coupled to the spring case may be called the "outboard end". The outboard end of the spring may move relatively slowly compared to the inboard end. Thus the inertia of the inboard end of the spring may contribute to the energy loss to the same extent as the inertia of the shuttle however the inertia of the outboard end may have a diminished influence on the energy loss. In examples below, the difference between the inboard end and the outboard end are exploited. In other examples, the shuttle size is made smaller so that it may weigh less thus making its inertia smaller.

Figure 9A:
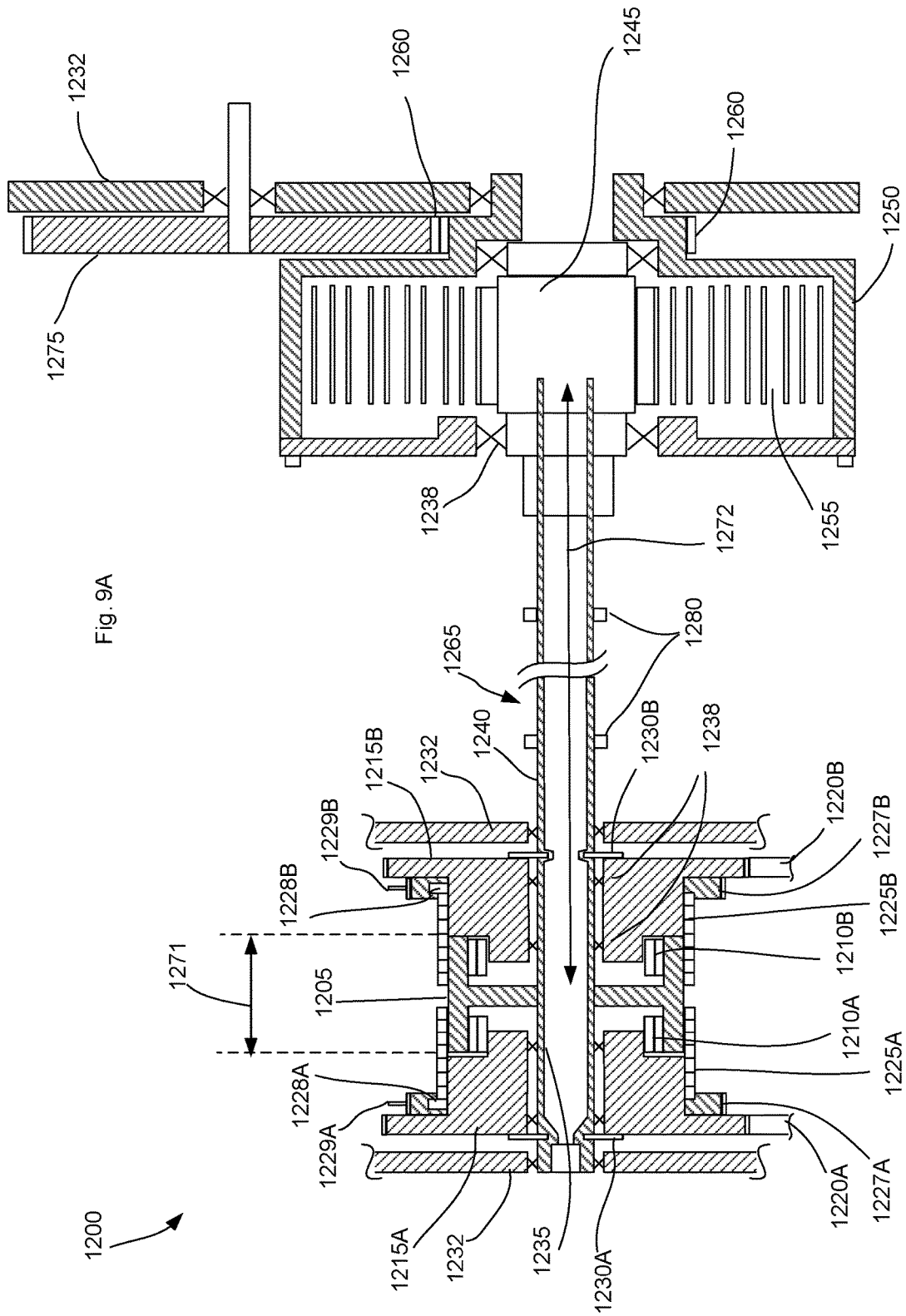
FIG. 9A is a cross-sectional view of an example of a class D mechanical analog with a torsion tube.
Figure 9B:
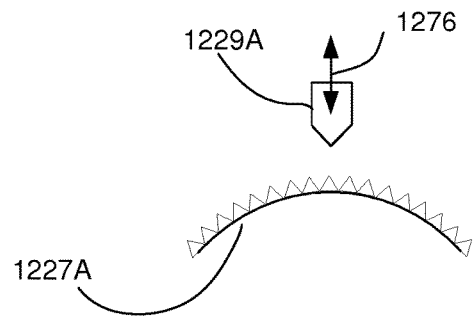
FIG. 9B is a front view of a section of the engagement mechanism for the device in FIG. 9A.

FIG. 9A illustrates the example of a drive mechanism with a shuttle that has low inertia and one where the difference of inertia between the inboard end and outboard end of a spring is exploited. FIG. 9A illustrates this example in relation to the class D mechanical analog although the same approaches may be applied to the buck circuit mechanical analog as well. FIG. 9A shows a cross-section of the device 1200. In FIG. 9A, the shuttle is depicted by 1205. The shuttle may be coupled to one side of two one-way clutches 1210A and 1210B. The input hubs are illustrated as 1215A and 1215B and may be coupled to the opposite side of the one-way clutches 1210A and 1210B. The input hubs may also be coupled to an external actuator such as constant spend motor. As described earlier, one input hub may rotate in the direction of the external motor while the other may rotate in the opposite direction as a reversing gear may be present between the output of the external motor and the input hub. The coupling of an external motor to the input hubs is illustrated by gears 1220A and 1220B. The rotation of the input hubs may be coupled to the shuttle by various mechanisms including but not limited to electrolaminate disc clutch, or a mechanically or electrolaminate activated wrap spring clutch. In the Figure, wrap spring clutches are illustrated. Springs 1225A and 1225B are shown respectively coupling input hubs 1215A and 1215B to the shuttle 1205. The springs 1225A and 1225B each wrap around their respective input hubs and one end of the shuttle. For example, spring 1225A wraps over the input hub 1215A and the left section of the shuttle 1205 in such a way that if the input hub rotates, spring 1225A will rotate along with it and wrap down on the left section of the shuttle, consequently imparting rotation to the shuttle in the same direction as the input. While noting that the other input hub 1215B may be rotating in the opposite direction as input hub 1215A, spring 1225B imparts motion to the right section of the shuttle in a similar manner. Each spring may have a tab 1228A and 1228B which may be coupled immovably to rings 1227A and 1227B respectively. Rings 1227A and 1227B may be geared and may be coupled to the input hubs so that they may either move with or slip over the input hub if held in place. The gears of rings 1227A and 1227B engage with engagement mechanisms 1229A and 1229B. The function of the rings 1227A and 1227B along with the engagement mechanisms 1229A and 1229B will now be described with the help of FIG. 9B which shows a front view of a section of the ring 1227A along with the engagement mechanism 1229A. The other ring and engagement mechanism are identical and are not shown. The engagement mechanism may be caused to move in a bidirectional manner along the arrow 1276. The engagement mechanism may engage with the teeth of the geared ring and may stop the ring from rotating. Alternatively, the engagement mechanism may be positioned away from the geared ring allowing the ring to rotate.

Returning back to FIG. 9A, when for example the engagement mechanism 1229A engages with the ring 1227A, the tab of spring 1225A is held in place and the spring is unable to wind down on the input hub 1215A. When this occurs, no rotation is imparted to the shuttle. When the engagement mechanism 1229A disengages from the ring 1227A, the tab 1228A is no longer held in place and the spring is able to clamp down on the input hub and the shuttle, causing the rotation of the input hub to be imparted to shuttle. The operation of the engagement mechanism 1229B and ring 1227B is exactly identical and will not be described. The engagement mechanisms 1229A and 1229B may be activated in one of many well-known ways including but not limited to mechanical means by suitable motors or electromagnetical means by solenoids. Thus with the mechanisms above, rotation may be imparted to the shuttle.

Shuttle 1205 may be immovably coupled to a tube 1265 which may be supported and may rotate within the housing of device 1200 on bearings such as 1238. For clarity only some of the bearings are enumerated. The housing is indicated by 1232 and appears on both sides of the shuttle. The housing may be an independent member or it may be part of a larger system such as the frame of a robot. The tube 1265 may have two parts 1235 and 1240. Section 1235 of the tube 1265 which is shown in the Figure generally to the left of the shuttle may provide mechanical support for the shuttle and the input hub 1215A to rotate on. Thus as is illustrated in the Figure, the input hub 1215A may rotate on the tube section 1235 on bearings. Section 1240 of the tube 1265 shown in the Figure generally to the right of the shuttle, may be a tubular torsion spring. The shuttle, the tube section 1235 and the tube section 1240 may all physically be one piece, but each member may be made of different components. Additionally, both sections 1235 and 1240 of the tube 1265 may provide the structure to locate the snap rings 1230A and 1230B. These snap rings may provide the means to keep the input hubs and the shuttle in place. Section 1235, as stated earlier is merely a tube with no spring like qualities; hence it may rotate just like the shuttle rotates. However, again as stated earlier, section 1240 may be a tubular torsion spring and its operation will be described below.

As may be seen in the Figure, section 1240 of the tube 1265, extends from the shuttle to another hub 1245. For convenience, the hub 1245 shall be called the "intermediate hub". The intermediate hub 1245 may be connected to a torsion spring 1255 which may be subsequently enclosed in a spring case 1250. The spring case may be supported by bearings 1238 on the intermediate hub. The spring case may be coupled to an output gear or hub 1260. The gear 1260 may drive another gear 1275 which may form the final output hub of the device 1200 and may be coupled to a load. The output gear may be supported by bearings on the housing 1232. The housing supporting the output gear may be the same as the housing supporting the shuttle and the input hubs or it may be different.

The operation of the device 1200 is now described. Springs 1225A and 1225B may be activated in the same manner as described earlier in FIG. 2. Thus by applying an appropriate sequence of engagement and disengagement of the springs 1225A and 1225B, the shuttle 1205 may be caused to rotate at a desired speed and direction. However, the shuttle in this device may be smaller particularly in the breadth dimension than the shuttle in FIG. 3A. The breadth dimension is illustrated by arrow 1271 in the Figure. The smaller shuttle has a lower weight, lowering the inertia and consequently diminishing the energy loss during process of engagement of the springs 1225A and 1225B. In addition, the shuttle is coupled to a torsion tube 1240 instead of a torsion spring as in FIG. 3A, which has implications for the inertia and therefore the energy loss. As is well known in the art, torsion tubes typically store more energy than a torsion spring for a given weight. This implies that the weight of the torsion tube coupled to the inboard section of the shuttle may be less than that of a torsion spring that may be coupled to the same shuttle, given that both the torsion tube and torsion spring are required to store the same energy. As stated earlier, the inboard section of the spring contributes to the energy loss as the shuttle, but by using a torsion tube of lesser weight, energy loss is diminished. In addition, as illustrated in the Figure, the outboard section of the device where a torsion spring may be used, may be partially isolated from the shuttle. Despite the weight of the torsion spring, its effect on the shuttle inertia may be diminished. It may now be seen that by using a torsion tube, a smaller shuttle may be used and the difference between the inboard and outboard section of the spring may be exploited to provide a device where the energy loss is diminished.

As is well known, although a torsion tube stores energy more efficiently than a torsion spring, the length of torsion tubes may be long. Also as is well known, the torsion tube, in part due to its length, may be susceptible to buckling. Hence in some examples, support structures such as but not limited to ribs may be coupled to the torsion tube to prevent buckling. In FIG. 9A, the ribs are indicated by 1280. These support structures may be placed on the outside of the tube or, in some other configurations, they may be placed on the inside of the tube. There may be one or several support structures.

Figure 9C:
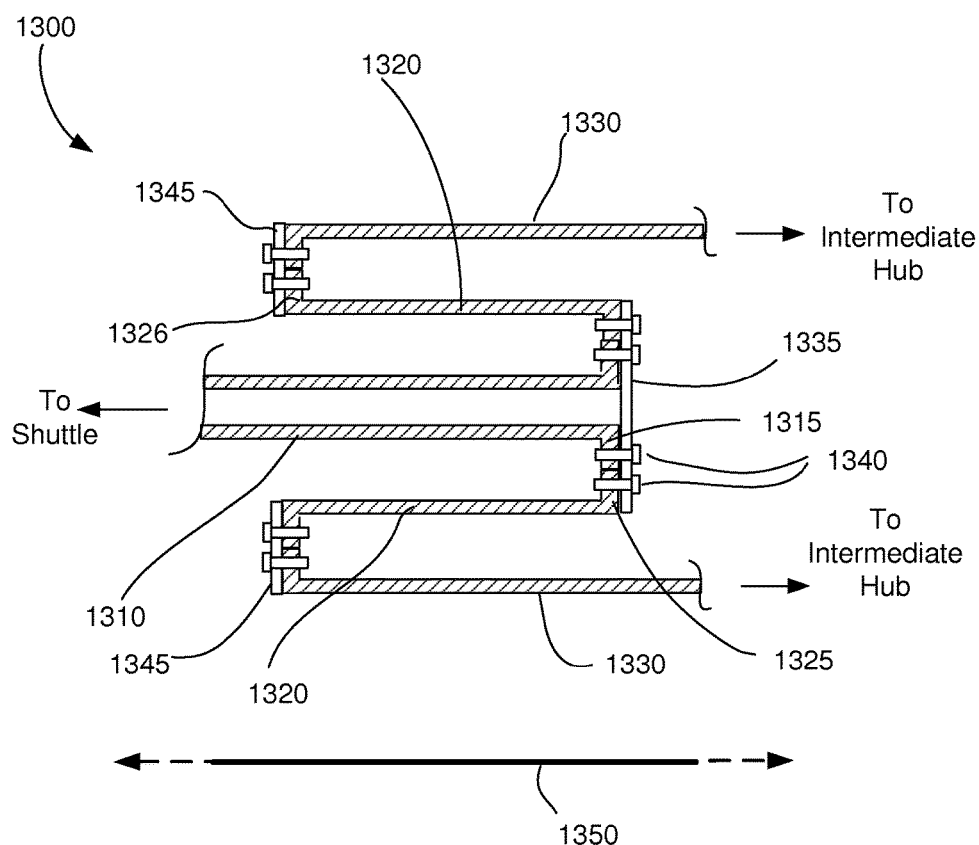
FIG. 9C is a cross-sectional view of an example of the use of a coaxial torsion tube.
Figure 9D:
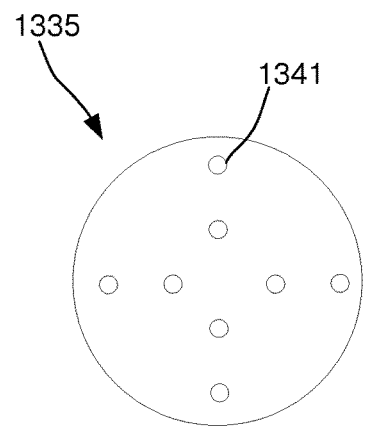
FIG. 9D is a diagram illustrating an example of a plate that may be used to couple the coaxial tubes of FIG. 9C.
Figure 9E:
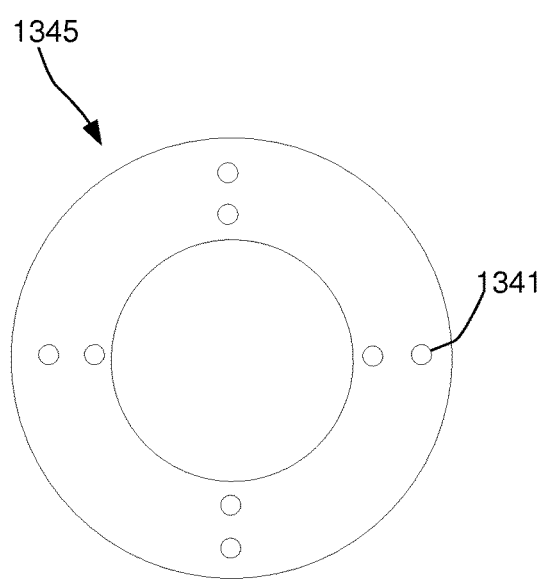
FIG. 9E is a diagram illustrating an example of a ring that may be used to couple the coaxial tubes of FIG. 9C.

In some applications, it may not be convenient to incorporate a long torsion tube. In FIG. 9A, the length of the torsion tube is indicated by the arrow 1272. Hence another example is described below where the length of the tube may be made smaller. FIG. 9C illustrates such a example. FIG. 9C illustrates a coaxial torsion tube. Only part of the torsion tube is illustrated. The Figure illustrates a tube with three sections although more sections may be present. Section 1310 may be coupled to the shuttle 1205 just as torsion tube 1240 may be coupled to the shuttle in FIG. 9A. Section 1310 may have a flange 1315 as indicated. The flange section may have holes such as a threaded holes to accommodate a screw or a nut. A second section 1320, also a torsion tube, with flanges 1325 and 1326, one on either side, may be arranged coaxially over the first section. The flanges of section 1320 may again have holes such as threaded holes as well, similar to the holes of section 1310. The second section is placed such that its predominant length direction is backwards compared to the predominant length direction of section 1310. The first and second section may be coupled by a circular plate 1335 which may have holes to accommodate screws or nuts. Nuts such as 1340 may be utilized to couple the first and second sections. The front view of the plate 1335 is shown in FIG. 9D where the holes are shown by 1341. Only one hole is enumerated. A third section which may again be a torsion tube, may be similarly coaxially coupled to the second section except now the coupling plate 1345 may be a ring as shown in FIG. 9E. In FIG. 9C, the third section is coupled to the intermediate hub 1245 of FIG. 9A. However, in some examples, there may be more than three sections. FIG. 9C illustrates each section with similar wall thicknesses but in other examples, the wall thickness of each segment may be different. In addition, although FIG. 9C does not illustrate the anti-buckling support features, they may be present in this configuration of FIG. 9C as well. In general, FIG. 9C illustrates that by utilizing coaxial tubes, the projected length illustrated by arrow 1350 may be less than the length illustrated by arrow 1272 in FIG. 9A. The projected length ignores the fold-back features of 1300. Thus, in applications where a shorter distance between the input and output sections are required, the configuration of FIG. 9C may be utilized.

Electrically Controllable Engagement Mechanisms

Figure 10A:
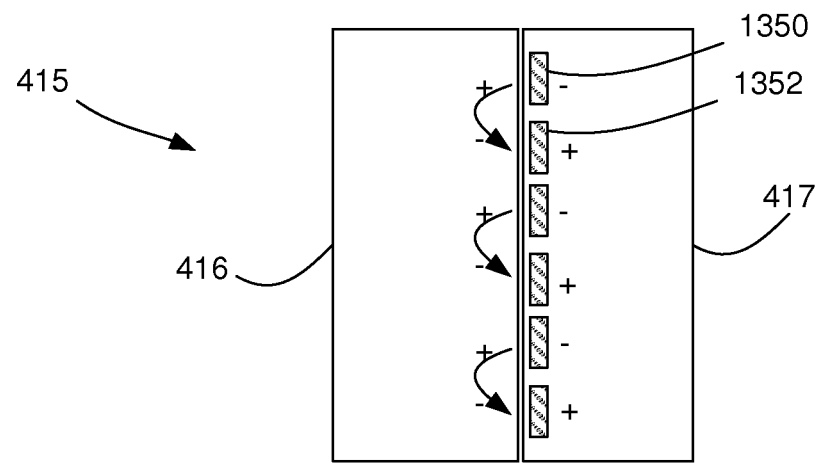
FIGS. 10A and 10B are diagrams illustrating examples of electrolaminate clutches that may be used as electrically controllable clutches, such as those illustrated in FIG. 3B.
Figure 10B:
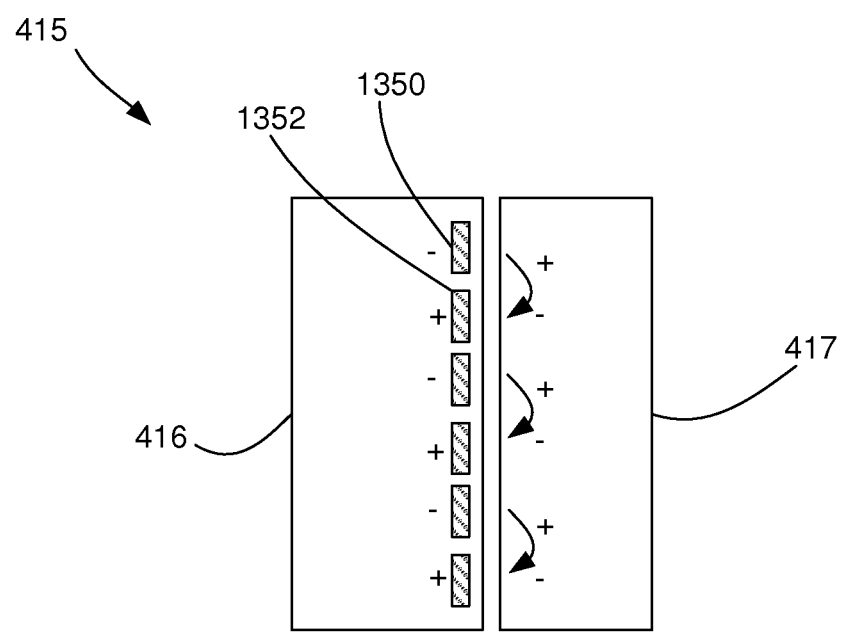

FIGS. 10A and 10B are diagrams illustrating examples of electrolaminate clutches that may be used as electrically controllable clutches, such as clutches 319A and 319B in FIG. 2B, 415A and 415B in FIG. 3A, and 1010A and 1010B in FIG. 7A. Various means may be utilized to increase the effective coupling in electrically controllable clutch devices. As one of ordinary skill in the art will appreciate, a variety of electrically controllable coupling techniques may be adapted for use in different examples of electrically controllable transmissions.

For example, electro-laminate effect, electroadhesion, electrostatic gripping and related terms generally refer to the mechanical coupling of two objects using electrostatic forces. Electroadhesion, as described herein, uses electrical control of electrostatic forces to permit temporary and detachable attachment between two objects. This electroadhesion holds two surfaces of these objects together or increases the traction or friction between two surfaces due to electrostatic forces created by an applied electric field. The characteristics of electroadhesion generally include low slippage, high shear force and low peel-off force when deactivated.

Figure 11:
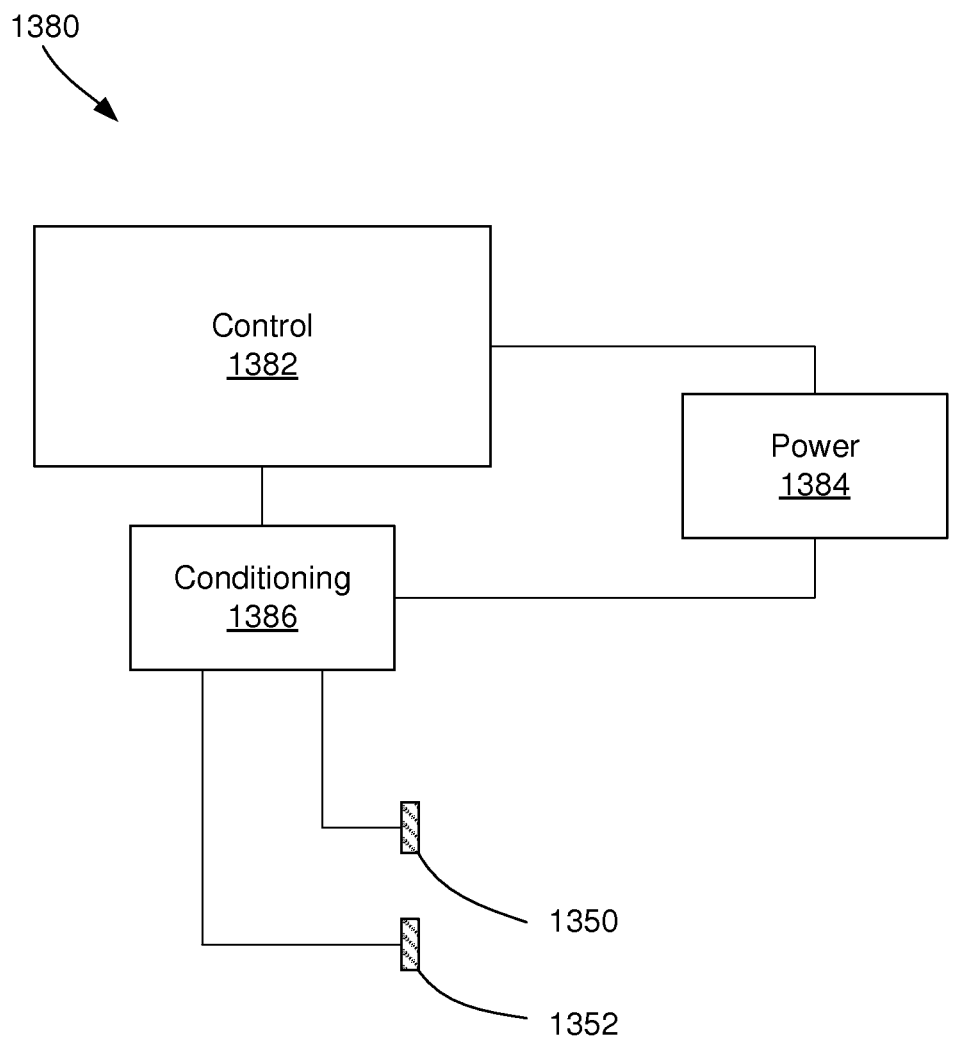
FIG. 11 is a functional block diagram illustrating an example of a control circuit.

In one example of an engagement technique between the discs of the clutches described above, electro-laminate effect depends on the electrostatic forces between surfaces, between the clutch discs in this case, to achieve clamping between the discs. For example, facing surfaces of discs 416 and 417 in FIGS. 10A-B may form the two electrolaminate surfaces. These arrangements provide for the clutch 415 to be controllably and reversibly engaged. In one approach, electroadhesion or electrically controlled reversible adhesion may be obtained by applying a voltage difference, such as a high level DC voltage, between facing surfaces of discs 416 and 417 in FIGS. 10A-B, to produce electrostatic attractive forces that increase traction between the discs. For example, voltage control circuit 1380 of FIG. 11 is electrically coupled to the discs 416 and 417 and applies a high voltage potential to induce in them the electro-laminate effect and clamp them together.

FIGS. 10A and 10B illustrate examples of electroadhesion where electrodes are provided in one of the discs 416 and 417 and an electroadhesion voltage is applied to those electrodes to increase traction between the discs. In the example of FIG. 10A, disc 417 is provided with at least one pair of adjacent electrodes 1350 and 1352, which are electrically isolated from one another, where, for example, each electrode is a loop of conductive material embedded in disc 417. Note that multiple pairs of electrodes may be provided in disc 417, as illustrated in the example of FIG. 10A. An electrostatic adhesion voltage produced by, for example, voltage conditioning circuit 1386, has alternating positive and negative voltages that are applied to adjacent electrodes 1350 and 1352 to create an electroadhesion effect. The voltage may be applied to electrodes 1350 and 1352 through a variety of techniques, such as rings and brushes, which will be readily understood by one of ordinary skill in the art.

As a result of the voltage difference between electrodes 1350 and 1352, an electric field forms in a dielectric surface of disc 417. The electric field locally polarizes the dielectric material and thus causes electrostatic adhesion between the electrodes 1350 and 1352 and disc 417 and the induced charges in the dielectric material of disc 416. The induced charges may be the result of the dielectric polarization or from weakly conductive materials and leakage currents, though the examples of electrically controllable engagement techniques is not limited by the examples illustrated. For example, the induced electrostatic forces may also use the Johnson-Rahbeck effect to provide increased forces at lower power levels.

Thus, the electrostatic adhesion voltage provides an electrostatic force between the disc 417 and the material beneath the surface of disc 416 to increase the traction between them and engage the clutch 415. Removal of the electrostatic adhesion voltage ceases the electrostatic adhesion force between discs 416 and 417, which reduces the traction between them and disengages the clutch. The electrostatic adhesion voltage is applied to engage the discs of the clutch during on time intervals and removed from the discs to disengage the discs during off time intervals, such as those described above with respect to the waveforms of FIGS. 2C-K, FIG. 4, and FIG. 5A.

FIG. 10B illustrates another example, wherein one or more pairs of adjacent electrodes 1350 and 1352 are provided in disc 416. An electrostatic adhesion voltage applied to electrodes 1350 and 1352 forms an electric field in a dielectric surface of disc 416 that locally polarizes the dielectric material of disc 417 and causes electrostatic adhesion between the electrodes 1350 and 1352 and disc 416 and the induced charges in the dielectric material of disc 417. Thus, traction between discs 416 and 417 may be electrically controlled by the selective application of the electrostatic adhesion voltage to electrodes 1350 and 1352.

FIG. 11 illustrates one simplified example of a voltage control circuit 1380, wherein a control circuit 1382, which may be a microprocessor or microcontroller, for example, controls conditioning circuit 1386, which may condition the electrostatic adhesion voltage signal applied to the discs of a clutch via electrodes 1350 and 1352. A power source 1384, such as a battery or power supply, for example, provides operating power for the voltage control circuit 1380 and provides the power for the electrostatic adhesion voltage signal applied to the electrodes. Control circuit 1382 may engage the transmission by causing conditioning circuit 1386 to output the electrostatic adhesion voltage to the discs of the clutch and disengage the transmission by causing conditioning circuit 1386 to stop generating the electrostatic adhesion voltage. This arrangement provides for the discs of the clutches described above, such as discs 416 and 417 of clutch 415 in FIG. 10B, to be controllably and reversibly coupled under control of voltage control circuit 1380.

In some embodiments, electroadhesion as described herein permits fast engagement and disengagement times and may be considered almost instantaneous. The speed of engagement and disengagement may be increased by several means. If the electrodes are configured with a narrower line width and closer spacing, then speed is increased using conductive or weakly conductive substrates, e.g the clutch disc 416 or 417 that does not include electrodes, because the time needed for charge to flow to establish the electroadhesive forces is reduced. Basically, the RC time constant of the distributed resistance-capacitance circuit including both electroadhesive device, e.g. the disc 416 or 417 that includes electrodes, and substrate is reduced. It is also possible to use higher voltage to establish a given level of electroadhesive forces more quickly, and one can also increase speed by overdriving the voltage temporarily to establish charge distributions and adaptations quickly. To increase disengagement speeds, a driving voltage that effectively reverses polarities of electrodes at a constant rate may be employed. Such a voltage prevents charge from building up in the dielectric substrate material and thus allows faster disengagement. Alternatively, a moderately conductive material can be used between the electrodes to provide faster discharge times at the expense of some additional driving power required. These forms of electrostatic adhesion voltage may be applied to engage the discs of the clutch during the on time intervals and removed from the discs to disengage the discs during the off time intervals described above with respect to the waveforms of FIGS. 2C-K, FIG. 4, and FIG. 5A.

As the term is used herein, an electrostatic adhesion voltage refers to a voltage that produces a suitable electrostatic force to couple an electroadhesive device, e.g. a disc with electrodes, to substrate, e.g. a disc with a dielectric surface material. The minimum voltage needed for the electroadhesive device will vary with a number of factors, such as: the size of the electroadhesive device, the material conductivity and spacing of the electrodes, the insulating material between electrodes, the dielectric surface material, the presence of any disturbances to electroadhesion such as dust, other particulates or moisture, the weight of any structures mechanically coupled to the electroadhesive device, compliance of the electroadhesive device, the dielectric and resistivity properties of the substrate, and the relevant gaps between electrodes and substrate. In one embodiment, the electrostatic adhesion voltage includes a differential voltage between the electrodes that is between about 500 volts and about 10 kilovolts. In a specific embodiment, the differential voltage is between about 2 kilovolts and about 5 kilovolts. Voltage for one electrode can be zero. Alternating positive and negative charges may also be applied to adjacent electrodes.

Returning to the example of FIG. 11, control circuitry 1380 is configured to determine when a suitable electrostatic adhesion voltage is applied to electrodes 1350 and 1352. Circuitry 1380 may include a processor or controller 1382 that provides on/off signals that determine when electrostatic adhesion voltages are applied and some of the characteristics of the voltage signal, such as magnitude. Circuitry 1380 may also determine the times associated with a charge and discharge cycle on the electroadhesive device. Examples of on/off signal schemes that may be generated under the control of control circuit 1382 are illustrated and described above in the context of FIGS. 2C-K, FIG. 4, and FIG. 5A.

Conditioning circuitry 1386 may include any circuitry configured to perform one or more of the following tasks: voltage step-up, which is used when applying a voltage to the electrodes 1350 and 1352, conversion between AC and DC power, voltage smoothing, and recovery of stored electrostatic energy. Conditioning circuitry 1386 may be designed to receive power from a low-voltage battery if such a battery is used as power source 1384. For example, in robotics applications, conditioning circuitry 1386 may receive a voltage from a conventional battery, such as those less than 40 volts, and increase the voltage to an electrostatic adhesion voltages above 1 kilovolt. The low voltage power source such as the battery may be replaced by another electrical source such as a small photovoltaic panels similar to the ones used in many handheld calculators. In one embodiment, conditioning circuitry 1386 includes a transformer or switching power supply configured to provide voltage step-up to electrostatic adhesion voltages described herein. In a specific embodiment, conditioning circuitry 1386 includes a model No. Q50-5 as provided by EMCO High Voltage Corporation of 70 Forest Products Road, Sutter Creek Calif. Conductive leads extend from conditioning circuitry 1386 to electrodes 1350 and 1352.

More complex charge control circuits may be developed, depending on the configuration of the electroadhesive device and are not limited to the example of FIG. 11. Also, some of the circuit functions may be integrated. For instance, one integrated circuit may perform the control of control circuit 1382 and of conditioning circuitry 1386.

The voltages provided to the electroadhesive devices may vary. In one embodiment, AC actuation is applied to the electrodes. In some cases, electrostatic forces on a dielectric substrate may relax over a time constant under steady DC actuation. This phenomena can also occur in an insulator if it traps charge. However, by alternating the polarity of charge on each of the electrodes at a high frequency, electroadhesive forces can be maintained or even enhanced.

In a specific embodiment, the AC signal includes a frequency above 1 Hz. Other higher and lower frequencies may be used. In another embodiment, multiple sets of electrodes are used with applied AC voltages offset in time or shifted in phase. This allows one set of electrodes to maintain electroadhesive forces while the AC voltage in another set temporarily passes through 0 voltage difference. In another embodiment, a DC actuation may be provided to the electrodes. In some of the cases with DC actuation, a moderately low insulator resistance may provide a leakage path to achieve a fast release when voltage is switched off. In other cases, a fixed amount of charge of opposite polarity to the DC actuation may be pulsed into the electrodes to provide release when desired. In this case, the fixed amount of charge may come from an external capacitor or one that is a part of the conditioning circuitry 1386 with a capacitance equal to that of the electroadhesive device, e.g. the discs of an electrically controllable clutch.

Switching and response times of an electroadhesive device will vary with the electrical equipment and signal applied to the electrodes. For example, a 5 Hz signal, with a voltage rise time of one-tenth of the time period, may provide a charge and discharge cycle of 20 milliseconds.

In general, electroadhesion requires a small amount of power to increase traction between an electroadhesive device, e.g. a disc with electrodes, and a dielectric substrate, e.g. a dielectric disc. The power requirement is small because electroadhesion may be primarily thought of as a capacitive effect. This implies that with appropriate selection of insulation material to minimize leakage currents, the reactive power remains small. Resistivity of insulating material may be reduced if trapped charge becomes a problem as long as the leakage current remains acceptable.

Further information regarding some electrostatic adhesion voltages that may be suitable for use in various examples of electrically controllable power transmission as described herein are described in commonly owned U.S. Pat. No. 7,551,419 for "Electroadhesion", as well as U.S. Pat. Nos. 7,554,787 and 7,773,363 and U.S. Published Application No. 20130010398 hereby incorporated in their entirety for all purposes.

Other examples of electrostatic techniques may be adaptable for use in the presently described electrically controllable transmissions. For example, electrostatic gripping has been utilized in a variety of industries, including semiconductor manufacturing, for many years, examples of which are shown in U.S. Pat. No. 5,103,367 for "Electrostatic Chuck Using A.C. Field Excitation", U.S. Pat. No. 5,325,261 for "Electrostatic Chuck with Improved Release", and U.S. Pat. No. 6,922,324 for "Remote Powering of Electrostatic Chucks".

Other forms of electrically controllable coupling may possibly be adapted for use in the examples of electrically controllable transmissions discussed herein, such as eddy current braking described in U.S. Pat. No. 7,592,727 for "Quiet Load for Motor Testing" or the inductive coupling described in U.S. Pat. No. 5,856,710 for "Inductively Coupled Energy and Communication Apparatus". Another electrically controllable coupling approach that may be adapted in some examples includes magnetic coupling, where, for example, a disc with electromagnets adjacent its outer surface that engages electromagnets in another disc and the electromagnets are configured to have alternating polarity to provide torque transfer between the discs. Further information regarding magnetic coupling is described at Magnetically Coupled Drive—OpenROV R&D (https://forum.openrov.com/t/magnetically-coupled-drive/30) and magnetic gearing techniques, an example of which is described in U.S. Pat. No. 5,569,967 for "Magnetic Gear and Gear Train Configuration". These references are also incorporated by reference in their entirety for all purposes.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the invention.

I claim:

1. An electrically controllable transmission system, the system comprising:
    a pilot shaft;
    a first input hub for receiving power from a power source, wherein the first input hub is configured to rotate about the pilot shaft;
    a first electrically controllable clutch having a first portion configured to be coupled to the first input hub and a second portion, where the first and second portions are configured to be electrically controllably coupled to one another such that power is transmitted from the first portion to the second portion;
    a rotatable member connected to the second portion of the first electrically controllable clutch, wherein the rotatable member is configured to rotate about the pilot shaft;
    a first one-way clutch configured to couple the rotatable member to a stationary chassis;
    an output hub, wherein the output hub is configured to rotate about the pilot shaft; and
    a bias member coupling the rotatable member to the output hub, wherein the bias member comprises a spring that stores energy when the first electrically controllable clutch is engaged and releases energy when the first electrically controllable clutch is disengaged, and wherein the spring stores energy by winding and releases energy by unwinding.

2. The electrically controllable transmission system of claim 1, where the first and second portions of the electrically controllable clutch are configured to be electroadhesively engaged.

3. The electrically controllable transmission system of claim 1, where the first electrically controllable clutch further comprises one of an electrolaminate disc clutch, an electrolaminate activated wrap spring clutch, and an electromagnetically activated wrap spring clutch.

4. The electrically controllable transmission system of claim 1, where the system further includes a control circuit configured to control engaged and disengaged time intervals of the first electrically controllable clutch to maintain a torque level or a speed at the output hub.

5. The electrically controllable transmission system of claim 4, where the control circuit is configured to control the engaged and disengaged time intervals of the first electrically controllable clutch to maintain the torque level or speed at the output hub utilizing one of pulse width modulation and pulse frequency modulation.

6. A method for electrically controllably transmitting power from a power source, the method comprising:
receiving power from the power source at a first input hub configured to rotate about a pilot shaft;
electrically controllably coupling the first input hub to a rotatable member configured to rotate about the pilot shaft, such that power is electrically controllably transmitted from the first input hub to the rotatable member;
providing for one-way rotation between the rotatable member and a stationary chassis; and
coupling the rotatable member to an output hub with a spring, wherein the output hub is configured to rotate about the pilot shaft such that energy is stored and released from the spring as the output hub rotates about the pilot shaft, wherein the spring stores energy by winding and releases energy by unwinding.

7. The method for electrically controllably transmitting power of claim 6, where the step of electrically controllably coupling the first input hub to the rotatable member further includes electroadhesively coupling the first input hub to the rotatable member.

8. The method for electrically controllably transmitting power of claim 6, where the step of electrically controllably coupling the first input hub to the rotatable member further includes using one of an electrolaminate disc clutch, an electrolaminate activated wrap spring clutch, or an electromagnetically activated wrap spring clutch.

9. The method for electrically controllably transmitting power of claim 6, where the step of electrically controllably coupling the first input hub to the rotatable member further includes controlling engaged and disengaged time intervals of the first input hub and rotatable member to maintain a torque level or speed at the output hub.

10. The method for electrically controllably transmitting power of claim 9, where the step of controlling engaged and disengaged time intervals of the first input hub and rotatable member further comprises controlling the engaged and disengaged time intervals utilizing one of pulse width modulation or pulse frequency modulation.

11. An electrically controllable power transmission apparatus, the apparatus comprising:
means for electrically controllably coupling a first input hub to a rotatable member such that power is electrically controllably transmitted from the first input hub to the rotatable member, wherein the first input hub and rotatable member are configured to rotate about a pilot shaft;
means for providing one-way rotation between the rotatable member and a stationary chassis; and
means for coupling the rotatable member to an output hub configured to rotate about the pilot shaft such that energy is stored and released as the output hub rotates about the pilot shaft, wherein the means for coupling the shuttle to the output hub comprises a spring, wherein the spring stores energy by winding and releases energy by unwinding.

12. The electrically controllable power transmission apparatus of claim 11, the apparatus further comprising means for controlling engaged and disengaged time intervals of the first input hub and rotatable member to maintain a torque level or speed at the output hub.

* * * * *